US010701127B2

United States Patent
Spitz et al.

(10) Patent No.: US 10,701,127 B2
(45) Date of Patent: Jun. 30, 2020

(54) APPARATUS AND METHOD FOR SUPPORTING RELATIONSHIPS ASSOCIATED WITH CONTENT PROVISIONING

(71) Applicant: AiBUY, Inc., Dallas, TX (US)

(72) Inventors: Robert K. Spitz, Amherst, NH (US); Todd Downing, Irving, TX (US); Christian Briggs, Austin, TX (US)

(73) Assignee: AiBUY, Inc., Dallas, TX (US)

( * ) Notice: Subject to any disclaimer, the term of this patent is extended or adjusted under 35 U.S.C. 154(b) by 0 days.

(21) Appl. No.: 14/497,686

(22) Filed: Sep. 26, 2014

(65) Prior Publication Data

US 2015/0095455 A1    Apr. 2, 2015

Related U.S. Application Data

(60) Provisional application No. 61/883,949, filed on Sep. 27, 2013, provisional application No. 61/883,809, filed on Sep. 27, 2013.

(51) Int. Cl.
*H04N 21/254* (2011.01)
*H04L 29/08* (2006.01)
(Continued)

(52) U.S. Cl.
CPC ......... *H04L 67/02* (2013.01); *G06Q 30/0251* (2013.01); *G06Q 30/0601* (2013.01);
(Continued)

(58) Field of Classification Search
CPC .. H04N 21/00; H04N 21/4316; H04N 21/478; H04N 21/2542; H04N 21/47815; H04N 21/6582; H04N 21/812; G06Q 30/0251; G06Q 30/0601; H04L 67/02; H04L 67/30; H04L 67/303; H04L 67/306
See application file for complete search history.

(56) References Cited

U.S. PATENT DOCUMENTS 5,774,664 A    6/1998 Hidary et al.
5,778,181 A    7/1998 Hidary et al.
(Continued)

FOREIGN PATENT DOCUMENTS

CA    2849882    2/2013
CN    1867909    11/2006
(Continued)

OTHER PUBLICATIONS

International Search Report dated Nov. 24, 2014 in connection with International Application No. PCT/US14/55233; 2 pages.
(Continued)

*Primary Examiner* — Le H Luu

(57) ABSTRACT

A method includes receiving transaction information related to supplemental content that is presented in association with base content, where the transaction information includes an identification of a user. The method also includes identifying a relationship between the user and a content provider that provided the base content using the identification. The method further includes obtaining user transaction credentials from the content provider and completing a transaction for the user using the user transaction credentials.

20 Claims, 5 Drawing Sheets

(51) Int. Cl.
*G06Q 30/06* (2012.01)
*G06Q 30/02* (2012.01)
*H04N 21/478* (2011.01)
*H04N 21/81* (2011.01)
*H04N 21/658* (2011.01)

(52) U.S. Cl.
CPC ............ *H04L 67/30* (2013.01); *H04L 67/303* (2013.01); *H04L 67/306* (2013.01); *H04N 21/2542* (2013.01); *H04N 21/47815* (2013.01); *H04N 21/6582* (2013.01); *H04N 21/812* (2013.01)

(56) References Cited

U.S. PATENT DOCUMENTS

| | | | |
|---|---|---|---|
| 5,903,816 | A | 5/1999 | Broadwin et al. |
| 5,929,849 | A | 7/1999 | Kikinis |
| 6,006,257 | A | 12/1999 | Slezak |
| 6,009,410 | A | 12/1999 | LeMole et al. |
| 6,014,638 | A | 1/2000 | Burge et al. |
| 6,018,768 | A | 1/2000 | Ullman et al. |
| 6,154,771 | A | 11/2000 | Rangan et al. |
| 6,169,573 | B1 | 1/2001 | Sampath-Kumar et al. |
| 6,188,398 | B1 | 2/2001 | Collins-Rector et al. |
| 6,233,682 | B1 | 5/2001 | Fritsch |
| 6,240,555 | B1 | 5/2001 | Shoff et al. |
| 6,263,505 | B1 | 7/2001 | Walker et al. |
| 6,275,989 | B1 | 8/2001 | Broadwin et al. |
| 6,282,713 | B1 | 8/2001 | Kitsukawa et al. |
| 6,321,209 | B1 | 11/2001 | Pasquali |
| 6,330,595 | B1 | 12/2001 | Ullman et al. |
| 6,357,042 | B2 | 3/2002 | Srinivasan et al. |
| 6,536,041 | B1 | 3/2003 | Knudson et al. |
| 6,564,380 | B1 | 5/2003 | Murphy |
| 6,604,049 | B2 | 8/2003 | Yokota |
| 6,628,307 | B1 | 9/2003 | Fair |
| 6,766,528 | B1 | 7/2004 | Kim et al. |
| 6,857,010 | B1 | 2/2005 | Cuijpers et al. |
| 6,910,049 | B2 | 6/2005 | Fenton et al. |
| 6,912,726 | B1 | 6/2005 | Chen et al. |
| 6,941,575 | B2 | 9/2005 | Allen |
| 6,976,028 | B2 | 12/2005 | Fenton et al. |
| 6,990,498 | B2 | 1/2006 | Fenton et al. |
| 7,000,242 | B1 | 2/2006 | Haber |
| 7,017,173 | B1 | 3/2006 | Armstrong et al. |
| 7,072,683 | B2 | 7/2006 | King et al. |
| 7,097,094 | B2 | 8/2006 | Lapstun et al. |
| 7,136,853 | B1 | 11/2006 | Kohda et al. |
| 7,158,676 | B1 | 1/2007 | Rainsford |
| 7,162,263 | B2 | 1/2007 | King et al. |
| 7,188,186 | B1 | 3/2007 | Meyer et al. |
| 7,207,057 | B1 | 4/2007 | Rowe |
| 7,222,163 | B1 | 5/2007 | Girouard et al. |
| 7,231,651 | B2 | 6/2007 | Pong |
| 7,243,139 | B2 | 7/2007 | Ullman et al. |
| 7,243,835 | B2 | 7/2007 | Silverbrook et al. |
| 7,254,622 | B2 | 8/2007 | Nomura et al. |
| 7,269,837 | B1 | 9/2007 | Redling et al. |
| 7,305,408 | B2 | 12/2007 | Morris |
| 7,331,057 | B2 | 2/2008 | Eldering et al. |
| 7,353,186 | B2 | 4/2008 | Kobayashi |
| 7,409,437 | B2 | 8/2008 | Ullman et al. |
| 7,412,406 | B2 | 8/2008 | Rosenberg |
| 7,432,768 | B2 | 10/2008 | Han et al. |
| 7,444,659 | B2 | 10/2008 | Lemmons |
| 7,464,344 | B1 | 12/2008 | Carmichael et al. |
| 7,485,397 | B2 | 2/2009 | Eck et al. |
| 7,487,112 | B2 | 2/2009 | Barnes, Jr. |
| 7,509,340 | B2 | 3/2009 | Fenton et al. |
| 7,539,738 | B2 | 5/2009 | Stuckman et al. |
| 7,555,444 | B1 | 6/2009 | Wilson et al. |
| 7,574,381 | B1 | 8/2009 | Lin-Hendel |
| 7,588,185 | B2 | 9/2009 | Berquist et al. |
| 7,593,965 | B2 | 9/2009 | Gabriel |
| 7,613,691 | B2 | 11/2009 | Finch |
| 7,614,013 | B2 | 11/2009 | Dollar et al. |
| 7,624,416 | B1 | 11/2009 | Vandermolen et al. |
| 7,631,327 | B2 | 12/2009 | Dempski et al. |
| 7,661,121 | B2 | 2/2010 | Smith et al. |
| 7,664,678 | B1 | 2/2010 | Haber |
| 7,673,017 | B2 | 3/2010 | Kim et al. |
| 7,691,666 | B2 | 4/2010 | Levy et al. |
| 7,721,307 | B2 | 5/2010 | Hendricks et al. |
| 7,739,596 | B2 | 6/2010 | Clarke-Martin et al. |
| 7,750,343 | B2 | 7/2010 | Choi et al. |
| 7,756,758 | B2 | 7/2010 | Johnson et al. |
| 7,769,827 | B2 | 8/2010 | Girouard et al. |
| 7,769,830 | B2 | 8/2010 | Stuckman et al. |
| 7,773,093 | B2 | 8/2010 | Bates et al. |
| 7,774,161 | B2 | 8/2010 | Tischer |
| 7,774,815 | B1 | 8/2010 | Allen |
| 7,800,102 | B2 | 9/2010 | Park et al. |
| 7,804,506 | B2 | 9/2010 | Bates et al. |
| 7,818,763 | B2 | 10/2010 | Sie et al. |
| 7,840,415 | B2 | 11/2010 | Schifone |
| 7,853,477 | B2 | 12/2010 | O'Shea et al. |
| 7,870,592 | B2 | 1/2011 | Hudson et al. |
| 7,885,951 | B1 | 2/2011 | Rothschild |
| 7,899,719 | B2 | 3/2011 | Lin-Hendel |
| 7,912,753 | B2 | 3/2011 | Struble |
| 7,923,722 | B2 | 4/2011 | Ryu et al. |
| 7,925,973 | B2 | 4/2011 | Allaire et al. |
| 7,946,492 | B2 | 5/2011 | Rohs |
| 7,975,020 | B1 | 7/2011 | Green et al. |
| 7,975,062 | B2 | 7/2011 | Krikorian et al. |
| 7,979,877 | B2 | 7/2011 | Huber et al. |
| 7,982,216 | B2 | 7/2011 | Imai |
| 7,987,098 | B2 | 7/2011 | Schifone |
| 7,987,483 | B1 | 7/2011 | Des Jardins |
| 8,001,116 | B2 | 8/2011 | Cope |
| 8,001,577 | B2 | 8/2011 | Fries |
| 8,006,265 | B2 | 8/2011 | Redling et al. |
| 8,010,408 | B2 | 8/2011 | Rubinstein et al. |
| 8,032,421 | B1 | 10/2011 | Ho et al. |
| 8,055,688 | B2 | 11/2011 | Giblin |
| 8,086,502 | B2 | 12/2011 | Krishnamurthy et al. |
| 8,091,103 | B2 | 1/2012 | Cope |
| 8,108,257 | B2 | 1/2012 | Sengamedu |
| 8,112,324 | B2 | 2/2012 | Frank et al. |
| 8,122,480 | B2 | 2/2012 | Sholtis |
| 8,132,486 | B1 | 3/2012 | Calvert |
| 8,141,112 | B2 | 3/2012 | Cope et al. |
| 8,181,212 | B2 | 5/2012 | Sigal |
| 8,196,162 | B2 | 6/2012 | van de Klashorst |
| 8,199,966 | B2 | 6/2012 | Guven et al. |
| 8,312,486 | B1 | 11/2012 | Briggs et al. |
| 8,316,450 | B2 | 11/2012 | Robinson et al. |
| 8,341,152 | B1 | 12/2012 | Bates |
| 8,433,611 | B2 | 4/2013 | Lax et al. |
| 8,438,646 | B2 | 5/2013 | Sidi |
| 8,458,053 | B1 | 6/2013 | Buron et al. |
| 8,468,562 | B2 | 6/2013 | Miller et al. |
| 8,549,555 | B2 | 10/2013 | Briggs et al. |
| 8,560,583 | B2 | 10/2013 | Mallinson |
| 8,615,474 | B2 | 12/2013 | Avedissian et al. |
| 8,635,169 | B2 | 1/2014 | Avedissian et al. |
| 8,639,621 | B1 | 1/2014 | Ellis et al. |
| 8,645,214 | B2 | 2/2014 | Hipolito et al. |
| 8,645,217 | B2 | 2/2014 | Siegel et al. |
| 8,645,991 | B2 | 2/2014 | Siegel et al. |
| 8,655,146 | B2 | 2/2014 | Bennett et al. |
| 8,682,809 | B2 | 3/2014 | Avedissian et al. |
| 8,689,251 | B1 | 4/2014 | Heath |
| 8,695,877 | B2 | 4/2014 | Mesaros |
| 8,708,223 | B2 | 4/2014 | Gates et al. |
| 8,752,083 | B2 | 6/2014 | Geer, III et al. |
| 8,769,016 | B2 | 7/2014 | Jakobson |
| 8,769,053 | B2 | 7/2014 | Spitz et al. |
| 8,769,584 | B2 | 7/2014 | Neumeier et al. |
| 8,782,690 | B2 | 7/2014 | Briggs et al. |
| 8,813,132 | B2 | 8/2014 | Andrews, II et al. |
| 8,874,575 | B2 | 10/2014 | Mallinson |
| 8,893,173 | B2 | 11/2014 | Briggs et al. |

(56) References Cited

U.S. PATENT DOCUMENTS

| | | |
|---|---|---|
| 9,002,727 B2 | 4/2015 | Horowitz et al. |
| 9,087,358 B1 | 7/2015 | Giorgalli |
| 9,091,851 B2 | 7/2015 | Border et al. |
| 9,113,217 B2 | 8/2015 | Mallinson |
| 9,256,601 B2 | 2/2016 | Mallinson |
| 9,697,504 B2 | 7/2017 | Spitz et al. |
| 9,875,489 B2 | 1/2018 | Spitz et al. |
| 9,953,347 B2 | 4/2018 | Spitz et al. |
| 10,268,994 B2 | 4/2019 | Spitz et al. |
| 2001/0016828 A1* | 8/2001 | Philippe .................. G06F 17/22 705/26.8 |
| 2002/0059196 A1 | 5/2002 | l'Anson et al. |
| 2002/0062481 A1 | 5/2002 | Slaney et al. |
| 2002/0066103 A1 | 5/2002 | Gagnon et al. |
| 2002/0075332 A1 | 6/2002 | Geilfuss, Jr. et al. |
| 2002/0078441 A1 | 6/2002 | Drake et al. |
| 2002/0083447 A1 | 6/2002 | Heron et al. |
| 2002/0083469 A1 | 6/2002 | Jeannin et al. |
| 2002/0126990 A1 | 9/2002 | Rasmussen et al. |
| 2002/0133414 A1* | 9/2002 | Pradhan .................. G06Q 30/06 705/26.44 |
| 2002/0199181 A1 | 12/2002 | Allen |
| 2003/0004750 A1 | 1/2003 | Teraoka et al. |
| 2003/0018971 A1 | 1/2003 | McKenna |
| 2003/0023490 A1 | 1/2003 | Lenyon et al. |
| 2003/0028873 A1 | 2/2003 | Lemmons |
| 2003/0055667 A1 | 3/2003 | Sgambaro et al. |
| 2003/0135563 A1 | 7/2003 | Bodin et al. |
| 2003/0149983 A1 | 8/2003 | Markel |
| 2003/0163832 A1 | 8/2003 | Tsuria et al. |
| 2003/0195800 A1 | 10/2003 | Peters |
| 2003/0208396 A1 | 11/2003 | Miller et al. |
| 2003/0220835 A1 | 11/2003 | Barnes, Jr. |
| 2003/0220841 A1* | 11/2003 | Maritzen ............ G06Q 30/0613 705/26.41 |
| 2003/0228615 A1 | 12/2003 | Rossi et al. |
| 2003/0231851 A1 | 12/2003 | Rantala et al. |
| 2004/0003406 A1 | 1/2004 | Billmaier |
| 2004/0021684 A1 | 2/2004 | Millner |
| 2004/0056101 A1 | 3/2004 | Barkan et al. |
| 2004/0064379 A1 | 4/2004 | Anderson et al. |
| 2004/0204063 A1 | 10/2004 | Van Erlach |
| 2005/0021369 A1 | 1/2005 | Cohen et al. |
| 2005/0022226 A1 | 1/2005 | Ackley et al. |
| 2005/0029514 A1 | 2/2005 | Moriya |
| 2005/0033656 A1 | 2/2005 | Wang et al. |
| 2005/0076372 A1 | 4/2005 | Moore et al. |
| 2006/0009243 A1 | 1/2006 | Dahan et al. |
| 2006/0122895 A1 | 6/2006 | Abraham et al. |
| 2006/0136305 A1 | 6/2006 | Fitzsimmons et al. |
| 2006/0169772 A1 | 8/2006 | Page et al. |
| 2006/0202191 A1 | 9/2006 | Gerlach et al. |
| 2006/0230064 A1 | 10/2006 | Perkowski |
| 2006/0242016 A1 | 10/2006 | Chenard |
| 2006/0253290 A1 | 11/2006 | Kwon |
| 2006/0256133 A1 | 11/2006 | Rosenberg |
| 2006/0265657 A1 | 11/2006 | Gilley |
| 2006/0276266 A1 | 12/2006 | Sullivan |
| 2007/0030080 A1 | 2/2007 | Han et al. |
| 2007/0083762 A1 | 4/2007 | Martinez |
| 2007/0087489 A1 | 4/2007 | Park et al. |
| 2007/0088746 A1 | 4/2007 | Baker |
| 2007/0106646 A1 | 5/2007 | Stern et al. |
| 2007/0150360 A1 | 6/2007 | Getz |
| 2007/0157228 A1 | 7/2007 | Bayer et al. |
| 2007/0180461 A1 | 8/2007 | Hilton |
| 2007/0204308 A1 | 8/2007 | Nicholas et al. |
| 2007/0239546 A1 | 10/2007 | Blum et al. |
| 2007/0241327 A1 | 10/2007 | Kim et al. |
| 2007/0250901 A1 | 10/2007 | McIntire et al. |
| 2007/0266399 A1 | 11/2007 | Sidi |
| 2007/0271149 A1 | 11/2007 | Siegel et al. |
| 2007/0276721 A1 | 11/2007 | Jackson |
| 2007/0288518 A1 | 12/2007 | Crigler et al. |
| 2007/0300263 A1 | 12/2007 | Barton et al. |
| 2007/0300280 A1 | 12/2007 | Turner et al. |
| 2008/0005999 A1 | 1/2008 | Pervan |
| 2008/0012010 A1 | 1/2008 | Myung-Seok et al. |
| 2008/0066099 A1 | 3/2008 | Brodersen et al. |
| 2008/0066107 A1 | 3/2008 | Moonka et al. |
| 2008/0091521 A1 | 4/2008 | Ho et al. |
| 2008/0091552 A1 | 4/2008 | Aas |
| 2008/0098425 A1 | 4/2008 | Welch |
| 2008/0109306 A1 | 5/2008 | Maigret et al. |
| 2008/0109844 A1 | 5/2008 | Baldeschwieler et al. |
| 2008/0126191 A1 | 5/2008 | Schiavi |
| 2008/0126226 A1 | 5/2008 | Popkiewicz et al. |
| 2008/0126949 A1 | 5/2008 | Sharma |
| 2008/0148283 A1 | 6/2008 | Allen et al. |
| 2008/0149921 A1 | 6/2008 | Choi et al. |
| 2008/0163283 A1 | 7/2008 | Tan et al. |
| 2008/0177627 A1 | 7/2008 | Cefail |
| 2008/0177630 A1 | 7/2008 | Maghfourian et al. |
| 2008/0222232 A1 | 9/2008 | Allen et al. |
| 2008/0222613 A1 | 9/2008 | Allen et al. |
| 2008/0235085 A1 | 9/2008 | Kovinsky et al. |
| 2008/0237340 A1 | 10/2008 | Emmons et al. |
| 2008/0250445 A1 | 10/2008 | Zigmond et al. |
| 2008/0255934 A1 | 10/2008 | Leventhal et al. |
| 2008/0270249 A1 | 10/2008 | Rosenbaum et al. |
| 2008/0276266 A1 | 11/2008 | Huchital et al. |
| 2008/0281685 A1 | 11/2008 | Jaffe et al. |
| 2008/0294694 A1 | 11/2008 | Maghfourian et al. |
| 2008/0296568 A1 | 12/2008 | Ryu et al. |
| 2008/0306999 A1 | 12/2008 | Finger et al. |
| 2008/0307310 A1 | 12/2008 | Segal et al. |
| 2008/0319852 A1 | 12/2008 | Gardner et al. |
| 2008/0319856 A1 | 12/2008 | Zito et al. |
| 2009/0013347 A1 | 1/2009 | Ahanger et al. |
| 2009/0018904 A1 | 1/2009 | Shipman et al. |
| 2009/0031382 A1 | 1/2009 | Cope |
| 2009/0032809 A1 | 2/2009 | Kim et al. |
| 2009/0043674 A1 | 2/2009 | Minsky et al. |
| 2009/0077598 A1 | 3/2009 | Watson et al. |
| 2009/0083140 A1 | 3/2009 | Phan |
| 2009/0083815 A1 | 3/2009 | McMaster et al. |
| 2009/0094339 A1 | 4/2009 | Allen et al. |
| 2009/0119169 A1 | 5/2009 | Chandratillake et al. |
| 2009/0132349 A1 | 5/2009 | Berkley et al. |
| 2009/0157500 A1 | 6/2009 | Ames et al. |
| 2009/0158322 A1 | 6/2009 | Cope et al. |
| 2009/0172793 A1 | 7/2009 | Newstadt et al. |
| 2009/0199230 A1 | 8/2009 | Kumar et al. |
| 2009/0210790 A1 | 8/2009 | Thomas |
| 2009/0248546 A1 | 10/2009 | Norris et al. |
| 2009/0259563 A1 | 10/2009 | Ruhuke et al. |
| 2009/0265255 A1 | 10/2009 | Jackson et al. |
| 2009/0265387 A1 | 10/2009 | Gabriel et al. |
| 2009/0276805 A1 | 11/2009 | Andrews, II et al. |
| 2009/0315776 A1 | 12/2009 | Khosravy et al. |
| 2009/0315995 A1 | 12/2009 | Khosravy et al. |
| 2009/0319348 A1 | 12/2009 | Khosravy et al. |
| 2009/0320073 A1 | 12/2009 | Reisman |
| 2009/0327894 A1 | 12/2009 | Rakib et al. |
| 2010/0030578 A1 | 2/2010 | Siddique et al. |
| 2010/0070529 A1 | 3/2010 | Gokturk et al. |
| 2010/0114983 A1 | 5/2010 | Robert et al. |
| 2010/0131385 A1 | 5/2010 | Harrang et al. |
| 2010/0145795 A1 | 6/2010 | Haber et al. |
| 2010/0153831 A1 | 6/2010 | Beaton |
| 2010/0162343 A1 | 6/2010 | Roberts et al. |
| 2010/0185504 A1 | 7/2010 | Rajan et al. |
| 2010/0211441 A1 | 8/2010 | Sprigg et al. |
| 2010/0223107 A1 | 9/2010 | Kim et al. |
| 2010/0228612 A1 | 9/2010 | Khosravy et al. |
| 2010/0247061 A1 | 9/2010 | Bennett et al. |
| 2010/0274673 A1 | 10/2010 | Isaac |
| 2010/0279766 A1 | 11/2010 | Pliska et al. |
| 2010/0280960 A1 | 11/2010 | Ziotopoulos et al. |
| 2010/0283827 A1 | 11/2010 | Bustamente |
| 2010/0287580 A1 | 11/2010 | Harding et al. |
| 2010/0299183 A1 | 11/2010 | Fujioka |
| 2010/0299616 A1 | 11/2010 | Chen et al. |
| 2010/0306805 A1 | 12/2010 | Neumeier et al. |

(56) References Cited

U.S. PATENT DOCUMENTS

| | | |
|---|---|---|
| 2010/0332329 A1 | 12/2010 | Roberts et al. |
| 2011/0004517 A1 | 1/2011 | Soto et al. |
| 2011/0052144 A1 | 3/2011 | Abbas et al. |
| 2011/0066504 A1 | 3/2011 | Chatow et al. |
| 2011/0071865 A1 | 3/2011 | Leeds et al. |
| 2011/0133176 A1 | 6/2011 | Lee et al. |
| 2011/0167456 A1 | 7/2011 | Kokenos et al. |
| 2011/0173300 A1 | 7/2011 | Levy et al. |
| 2011/0184798 A1 | 7/2011 | Wang et al. |
| 2011/0191809 A1 | 8/2011 | Briggs et al. |
| 2011/0196944 A1 | 8/2011 | Seno |
| 2011/0231260 A1 | 9/2011 | Price |
| 2011/0238755 A1 | 9/2011 | Khan et al. |
| 2011/0247042 A1 | 10/2011 | Mallinson |
| 2011/0251897 A1 | 10/2011 | Litvack et al. |
| 2011/0276157 A1 | 11/2011 | Wang et al. |
| 2011/0306368 A1 | 12/2011 | McCarthy |
| 2011/0307397 A1 | 12/2011 | Benmbarek |
| 2011/0320317 A1 | 12/2011 | Yuan et al. |
| 2012/0030704 A1 | 2/2012 | Schiller et al. |
| 2012/0037697 A1 | 2/2012 | Boone et al. |
| 2012/0072957 A1 | 3/2012 | Cherukuwada et al. |
| 2012/0079021 A1 | 3/2012 | Roman et al. |
| 2012/0095805 A1 | 4/2012 | Ghosh et al. |
| 2012/0130855 A1 | 5/2012 | Nielsen et al. |
| 2012/0158511 A1 | 6/2012 | Lucero et al. |
| 2012/0166289 A1 | 6/2012 | Gadoury et al. |
| 2012/0185355 A1 | 7/2012 | Kilroy |
| 2012/0210340 A1 | 8/2012 | Reynolds et al. |
| 2012/0222064 A1 | 8/2012 | Geer, III et al. |
| 2012/0227060 A1 | 9/2012 | Allen et al. |
| 2012/0227074 A1 | 9/2012 | Hill et al. |
| 2012/0246073 A1 | 9/2012 | Gore et al. |
| 2012/0286583 A1 | 11/2012 | Ichikawa et al. |
| 2012/0296738 A1 | 11/2012 | Leeder |
| 2012/0296782 A1 | 11/2012 | Tsai et al. |
| 2012/0311662 A1 | 12/2012 | Abnous et al. |
| 2012/0330736 A1 | 12/2012 | Beckner et al. |
| 2013/0006790 A1 | 1/2013 | Raskin et al. |
| 2013/0014137 A1 | 1/2013 | Bhatia et al. |
| 2013/0014155 A1 | 1/2013 | Clarke et al. |
| 2013/0048723 A1 | 2/2013 | King |
| 2013/0051554 A1 | 2/2013 | Braness et al. |
| 2013/0054757 A1* | 2/2013 | Spitz ................. G06Q 30/0601 709/219 |
| 2013/0110608 A1 | 5/2013 | Cassidy et al. |
| 2013/0144903 A1 | 6/2013 | Andrews, II et al. |
| 2013/0151352 A1 | 6/2013 | Tsai et al. |
| 2013/0152123 A1 | 6/2013 | Briggs et al. |
| 2013/0166382 A1 | 6/2013 | Cassidy et al. |
| 2013/0183021 A1 | 7/2013 | Osman |
| 2013/0211891 A1 | 8/2013 | Daniel et al. |
| 2013/0212611 A1 | 8/2013 | Van Aacken et al. |
| 2013/0215116 A1 | 8/2013 | Siddique et al. |
| 2013/0218964 A1 | 8/2013 | Jakobson |
| 2013/0228615 A1 | 9/2013 | Gates et al. |
| 2013/0238452 A1 | 9/2013 | Frazier et al. |
| 2013/0263182 A1 | 10/2013 | Ivy et al. |
| 2013/0282522 A1 | 10/2013 | Hassan |
| 2013/0290550 A1 | 10/2013 | Bangalore et al. |
| 2014/0006129 A1 | 1/2014 | Heath |
| 2014/0019860 A1 | 1/2014 | Sathish et al. |
| 2014/0032366 A1 | 1/2014 | Spitz et al. |
| 2014/0046759 A1 | 2/2014 | Drozd et al. |
| 2014/0052576 A1 | 2/2014 | Zelenka et al. |
| 2014/0089142 A1 | 3/2014 | Jackovin |
| 2014/0095330 A1 | 4/2014 | Briggs et al. |
| 2014/0108111 A1 | 4/2014 | Klein |
| 2014/0164099 A1 | 6/2014 | Schlesinger et al. |
| 2014/0172530 A1 | 6/2014 | He |
| 2014/0250211 A1 | 9/2014 | Spitz et al. |
| 2014/0254942 A1 | 9/2014 | Liu et al. |
| 2014/0282700 A1 | 9/2014 | Briggs et al. |
| 2014/0303991 A1 | 10/2014 | Frank |
| 2014/0304075 A1 | 10/2014 | Dillingham et al. |
| 2014/0359671 A1 | 12/2014 | Andrews, II et al. |
| 2015/0039468 A1 | 2/2015 | Spitz et al. |
| 2015/0073919 A1 | 3/2015 | Spitz et al. |
| 2015/0074710 A1 | 3/2015 | Spitz et al. |
| 2015/0074711 A1 | 3/2015 | Spitz et al. |
| 2015/0092111 A1 | 4/2015 | Spitz et al. |
| 2015/0254632 A1 | 9/2015 | Shin et al. |
| 2018/0107993 A1 | 4/2018 | Spitz et al. |
| 2018/0308131 A1 | 10/2018 | Spitz et al. |
| 2019/0095955 A1 | 3/2019 | Spitz et al. |

FOREIGN PATENT DOCUMENTS

| | | |
|---|---|---|
| CN | 101529454 A | 9/2009 |
| CN | 102090080 A | 6/2011 |
| CN | 102150178 A | 8/2011 |
| CN | 102165439 A | 8/2011 |
| CN | 101826149 B | 6/2012 |
| EP | 0867690 B1 | 10/2003 |
| GB | 2401461 B | 5/2006 |
| JP | 2002-133324 A | 5/2002 |
| JP | 2002-150120 | 5/2002 |
| JP | 2002-516536 A | 6/2002 |
| JP | 2002-245141 | 8/2002 |
| JP | 2004-318475 A | 11/2004 |
| JP | 2006-085392 A | 3/2006 |
| JP | 2006-092300 A | 4/2006 |
| JP | 2007-048212 A | 2/2007 |
| JP | 2009-093292 | 4/2009 |
| JP | 2009-277224 A | 11/2009 |
| JP | 2009-282600 A | 12/2009 |
| JP | 2011-171903 A | 9/2011 |
| JP | 2012-517653 | 8/2012 |
| JP | 2013-500611 | 1/2013 |
| JP | 2013-516902 | 5/2013 |
| JP | 2013-529048 | 7/2013 |
| JP | 2013-529325 | 7/2013 |
| JP | 52-78093 | 9/2013 |
| WO | WO 99/60789 | 11/1999 |
| WO | WO 2001/069364 | 9/2001 |
| WO | WO 2002/101670 | 12/2002 |
| WO | WO 2005/019997 | 3/2005 |
| WO | WO 2008/016634 | 2/2008 |
| WO | WO 2008/118906 | 10/2008 |
| WO | WO 2008/138080 | 11/2008 |
| WO | WO 2008/146217 | 12/2008 |
| WO | WO 2009/012580 | 1/2009 |
| WO | WO 2009/027110 | 3/2009 |
| WO | WO 2009/032707 | 3/2009 |
| WO | WO 2009/085229 | 7/2009 |
| WO | WO 2009/145822 | 12/2009 |
| WO | WO 2010/009170 | 1/2010 |
| WO | WO 2010/050406 | 5/2010 |
| WO | WO 2010/074867 | 7/2010 |
| WO | WO 2010/096617 | 8/2010 |
| WO | WO 2011/009175 | 1/2011 |
| WO | WO 2011/057156 | 5/2011 |
| WO | WO 2011/084840 | 7/2011 |
| WO | WO 2011/123718 | 10/2011 |
| WO | WO 2011/123720 | 10/2011 |
| WO | WO 2011/149491 | 12/2011 |
| WO | WO 2012/009164 | 1/2012 |
| WO | WO 2012/088332 | 6/2012 |
| WO | WO 2012/106096 | 8/2012 |
| WO | WO 2012/135115 | 10/2012 |
| WO | WO 2012/157012 | 11/2012 |
| WO | WO 2013/033239 | 3/2013 |
| WO | WO 2013/080048 | 6/2013 |
| WO | WO 2013/129587 | 9/2013 |
| WO | WO 2013/192557 A2 | 12/2013 |
| WO | WO 2015/008156 | 1/2015 |
| WO | WO 2015/013117 | 1/2015 |
| WO | WO 2015/038795 | 3/2015 |
| WO | WO 2015/038798 | 3/2015 |
| WO | WO 2015/038802 | 3/2015 |
| WO | WO 2015/048375 | 4/2015 |

(56) References Cited

FOREIGN PATENT DOCUMENTS

WO    WO 2015/048377    4/2015
WO    WO 2015/054644    4/2015

OTHER PUBLICATIONS

Written Opinion of International Searching Authority dated Nov. 24, 2014 in connection with International Application No. PCT/US14/55233; 3 pages.
International Search Report dated Dec. 15, 2014 in connection with International Application No. PCT/US14/57595; 2 pages.
Written Opinion of International Searching Authority dated Dec. 15, 2014 in connection with International Application No. PCT/US14/57595; 3 pages.
International Search Report dated Dec. 16, 2014 in connection with International Application No. PCT/US14/55226; 2 pages.
Written Opinion of International Searching Authority dated Dec. 16, 2014 in connection with International Application No. PCT/US14/55226; 4 pages.
International Search Report dated Dec. 16, 2014 in connection with International Application No. PCT/US14/55229; 2 pages.
Written Opinion of International Searching Authority dated Dec. 16, 2014 in connection with International Application No. PCT/US14/55229; 4 pages.
International Search Report dated Jan. 9, 2015 in connection with International Application No. PCT/US14/57597; 2 pages.
Written Opinion of International Searching Authority dated Jan. 9, 2015 in connection with International Application No. PCT/US14/57597; 4 pages.
Non-Final Office Action dated Dec. 18, 2014 in connection with U.S. Appl. No. 14/484,047; 8 pages.
Non-Final Office Action dated Dec. 19, 2014 in connection with U.S. Appl. No. 14/484,065; 8 pages.
Non-Final Office Action dated Dec. 26, 2014 in connection with U.S. Appl. No. 14/484,225; 8 pages.
Non-Final Office Action dated Jan. 6, 2015 in connection with U.S. Appl. No. 14/512,204; 18 pages.
Non-Final Office Action dated Jan. 9, 2015 in connection with U.S. Appl. No. 14/292,423; 14 pages.
International Search Report dated Jan. 26, 2015 in connection with International Application No. PCT/US2014/060150; 2 pages.
Written Opinion of International Searching Authority dated Jan. 26, 2015 in connection with International Application No. PCT/US2014/060150; 4 pages.
First Office Action for Chinese Application No. 201480050030.1, dated Sep. 6, 2018, 16 pages.
Second Office Action for Chinese Application No. 201480050030.1, dated Feb. 19, 2019, 7 pages.
Office Action for U.S. Appl. No. 15/845,763, dated Feb. 25, 2019, 5 pages.
First Office Action for Chinese Application No. 201480050031.6, dated Sep. 6, 2018, 17 pages.
Second Office Action for Chinese Application No. 201480050031.6, dated Feb. 3, 2019, 11 pages.
Notice of Reasons for Rejection for Japanese Application No. 2016-542112, dated Jan. 10, 2019, 7 pages.
Office Action for U.S. Appl. No. 15/959,456, dated Jan. 10, 2019, 10 pages.
First Office Action for Chinese Application No. 201480052902.8, dated Jan. 14, 2019, 26 pages.
Decision of Rejection for Japanese Application No. 2016-545237, dated Feb. 12, 2019, 9 pages.
Notice of Reasons for Rejection for Japanese Application No. 2016-545236, dated Oct. 2, 2018, 9 pages.
Office Action for U.S. Appl. No. 14/484,047, dated Jun. 6, 2018, 7 pages.
Examination Report No. 1 for Australian Application No. 2014318716, dated Feb. 5, 2018, 3 pages.
First Office Action for Chinese Application No. 201480050033, dated Jul. 3, 2018, 6 pages.
Notice of Reasons for Rejection for Japanese Application No. 2016-542115, dated May 7, 2018, 6 pages.
Notice of Reasons for Rejection for Japanese Application No. 2016-542113, dated Apr. 10, 2018, 4 pages.
Office Action for U.S. Appl. No. 15/845,763, dated Jul. 26, 2018, 7 pages.
Notice of Reasons for Rejection for Japanese Application No. 2016-542112, dated May 14, 2018, 6 pages.
Notice of Reasons for Rejection for Japanese Application No. 2016-545237, dated Jun. 27, 2018, 5 pages.
First Office Action for Chinese Application No. 201480052901.3, dated Apr. 4, 2018, 10 pages.
Office Action for U.S. Appl. No. 15/611,404, dated Feb. 8, 2018, 18 pages.
Office Action for U.S. Appl. No. 14/484,047, dated Dec. 12, 2016, 12 pages.
Office Action for U.S. Appl. No. 14/484,047, dated Apr. 7, 2016, 8 pages.
Office Action for U.S. Appl. No. 14/484,047, dated May 18, 2015, 9 pages.
Supplementary European Search Report for European Application No. 14843697.5, dated Jan. 9, 2017, 7 pages.
Office Action for U.S. Appl. No. 14/484,065, dated Jul. 1, 2016, 13 pages.
Office Action for U.S. Appl. No. 14/484,065, dated Nov. 23, 2015, 15 pages.
Office Action for U.S. Appl. No. 14/484,065, dated Jul. 17, 2015, 12 pages.
Supplementary European Search Report for European Application No. 14843444.2, dated Jan. 9, 2017, 7 pages.
Office Action for U.S. Appl. No. 14/484,225, dated Aug. 17, 2016, 11 pages.
Office Action for U.S. Appl. No. 14/484,225, dated Jan. 19, 2016, 12 pages.
Office Action for U.S. Appl. No. 14/484,225, dated May 21, 2015, 12 pages.
Supplementary European Search Report for European Application No. 14844749.3, dated Jan. 9, 2017, 7 pages.
Supplementary European Search Report for European Application No. 14848243.3, dated May 22, 2017, 7 pages.
Office Action for U.S. Appl. No. 14/498,800, dated Mar. 27, 2015, 18 pages.
Office Action for U.S. Appl. No. 14/498,800, dated Sep. 25, 2015, 20 pages.
Office Action for U.S. Appl. No. 14/498,800, dated May 5, 2016, 22 pages.
Supplementary European Search Report for European Application No. 14849116.0, dated Mar. 6, 2017, 8 pages.
Office Action for U.S. Appl. No. 14/292,423, dated Jul. 12, 2016, 14 pages.
International Search Report and Written Opinion for International Application No. PCT/US2010/057567, dated Jun. 24, 2011, 9 pages.
International Search Report and Written Opinion for International Application No. PCT/US2012/052897, dated Nov. 14, 2012, 6 pages.
International Search Report and Written Opinion for International Application No. PCT/US2013/047124, dated Jan. 10, 2014, 6 pages.
International Search Report and Written Opinion for International Application No. PCT/US2015/018140, dated Jun. 3, 2015, 9 pages.
Office Action for U.S. Appl. No. 12/363,713, dated Oct. 3, 2011, 9 pages.
Office Action for U.S. Appl. No. 12/363,713, dated Jun. 13, 2012, 13 pages.
Office Action for U.S. Appl. No. 12/787,505, dated Apr. 5, 2012, 16 pages.
Office Action for U.S. Appl. No. 12/787,505, dated Mar. 1, 2013, 10 pages.
Office Action for U.S. Appl. No. 12/787,505, dated Mar. 18, 2014, 10 pages.

(56) References Cited

OTHER PUBLICATIONS

Office Action for U.S. Appl. No. 12/787,505, dated Jul. 16, 2015, 14 pages.
Office Action for U.S. Appl. No. 12/787,505, dated Nov. 23, 2015, 14 pages.
Office Action for U.S. Appl. No. 12/787,505, dated Apr. 13, 2016, 14 pages.
Office Action for U.S. Appl. No. 12/787,505, dated Feb. 10, 2017.
Office Action for U.S. Appl. No. 12/787,505, dated Aug. 27, 2014, 12 pages.
Office Action for U.S. Appl. No. 12/787,505, dated Sep. 23, 2013, 10 pages.
Office Action for U.S. Appl. No. 12/787,505, dated Oct. 24, 2012, 9 pages.
Office Action for U.S. Appl. No. 12/434,569, dated Oct. 2, 2014, 10 pages.
Office Action for U.S. Appl. No. 12/434,569, dated Nov. 19, 2013, 11 pages.
Office Action for U.S. Appl. No. 12/434,569, dated Mar. 15, 2013, 8 pages.
Office Action for U.S. Appl. No. 12/434,569, dated May 4, 2012, 6 pages.
Office Action for U.S. Appl. No. 12/434,569, dated Mar. 20, 2014, 10 pages.
Office Action for U.S. Appl. No. 12/434,569, dated Jul. 18, 2013, 8 pages.
Office Action for U.S. Appl. No. 12/434,569, dated Oct. 25, 2012, 9 pages.
Office Action for U.S. Appl. No. 13/753,384, dated Oct. 25, 2013, 14 pages.
Office Action for U.S. Appl. No. 13/753,384, dated Jul. 9, 2014, 9 pages.
Office Action for U.S. Appl. No. 13/753,384, dated Dec. 20, 2013, 10 pages.
Office Action for U.S. Appl. No. 13/753,384, dated May 17, 2013, 9 pages.
Office Action for U.S. Appl. No. 14/079,385, dated Mar. 3, 2015.
Office Action for U.S. Appl. No. 14/079,385, dated Feb. 3, 2016.
Office Action for U.S. Appl. No. 14/079,385, dated Sep. 6, 2016.
Office Action for U.S. Appl. No. 14/079,385, dated Feb. 21, 2014, 10 pages.
Office Action for U.S. Appl. No. 14/079,385, dated Aug. 27, 2014, 12 pages.
Office Action for U.S. Appl. No. 14/042,477, dated Apr. 10, 2014, 9 pages.
Office Action for U.S. Appl. No. 14/091,219, dated Apr. 11, 2014, 9 pages.
Office Action for U.S. Appl. No. 14/091,219, dated Jul. 21, 2014, 11 pages.
Office Action for U.S. Appl. No. 13/923,089, dated Aug. 20, 2014, 10 pages.
Office Action for U.S. Appl. No. 13/923,089, dated Dec. 2, 2014, 5 pages.
Office Action for U.S. Appl. No. 13/923,089, dated Mar. 22, 2016, 11 pages.
Office Action for U.S. Appl. No. 14/484,047, dated Dec. 18, 2014, 7 pages.
Office Action for U.S. Appl. No. 14/484,065, dated Jul. 17, 2015, 13 pages.
Notification on Results of Estimation of Patentability of Invention for Russian Application No. 2012105917, dated Feb. 16, 2015, 7 pages.
Office Action for U.S. Appl. No. 14/512,204, dated Jul. 30, 2015, 21 pages.
International Search Report and Written Opinion for International Application No. PCT/US2015/019979, dated Jul. 30, 2015.
Office Action for Mexican Application No. MX/a/2012/002846, dated Aug. 13, 2013.
"Akamai for Media & Entertainment," Akamai Technologies, Inc., 2007, 38 pages.
"Ebd Web Video Player, Increase Online Video Ad Monetization," www.ebdsoft.tv, 2010, 2 pages.
"Content distributors can shopping-enable video content," www.web.archive.org, Apr. 27, 2007, 1 page.
Kaplan, D., "Delivery Agent lets you buy products in your favorite TV shows," www.web.archive.org, May 4, 2007, 4 pages.
"Shopisodes Enable You to Dress Like Your Favorite TV Character," www.web.archive.org, Oct. 26, 2007, 1 page.
Liebman, J., "Reality TV That's Social, Bravo!," www.web.archive.org, Dec. 22, 2008, 6 pages.
Wan, K. et al., "Advertising Insertion in Sports Webcasts," 2007, IEEE, p. 78-82.
Helft, M., "Google Aims to Make YouTube Profitable With Ads," The New York Times, Aug. 22, 2007, 3 pages.
Tomlinson, C., "Google Tries to Relive Past Glories by Making YouTube PPay for Itself," Birmingham Post, Sep. 4, 2007, 3 pages.
Skidgel, J., "Producing Flash CS3 Video, Techniques for Video Pros and Web Designers," 2007, 9 pages.
Krikke, J., "Streaming Video Transforms the Media Industry," IEEE, Jul./Aug. 2004, p. 6-12.
Mei, T. et al., "VideoSense—Towards Effective Online Video Advertising," Sep. 23-28, 2007, p. 1075-1084.
Van Vilet, H., "Where Television and Internet Meet . . . New Experiences for Rich Media," E-VIEW 02-1, Jan. 2002, 35 pages.
"IAB Announces Advertising Creative Guidelines for Online Broadband Video Commercials," Nov. 29, 2005, 4 pages.
"Digital Video In-Stream Ad Format Guidelines and Best Practices," Interactive Advertising Bureau, May 2008, 17 pages.
"Final Broadband Ad Creative Guidelines," Interactive Advertising Bureau, Standards & Guidelines, 4 pages.
"Broadband Ad Creative Guidelines," Dec. 31, 2006, 3 pages.
Rich Media Guidelines: Fall 2004, Dec. 31, 2006, 3 pages.
"About Rich Media Guidelines Compliance: In-Page Units," Jan. 7, 2007, 2 pages.
"About Rich Media Guidelines Compliance: Over-the-Page Units," Jan. 7, 2007, 2 pages.
"Digital Video Ad Serving Template (VAST), Version 2.0," iab., Nov. 2009, 18 pages (Redlined).
"Digital Video Ad Serving Template (VAST), Version 2.0," iab., Nov. 2009, 16 pages.
"DART Motif for In-Stream Helps Publishers Improve Efficiency, Push the Envelope with Video Ad Effects and Offer Advertisers Trusted, Reliable Reporting Metrics," Nov. 6, 2006, 3 pages.
"DoubleClick Debuts Video Ad-Serving Solution," Nov. 6, 2006, 2 pages.
Gannes, L., "YouTube's New Inline Ads: Screenshots," May 11, 2007, 7 pages.
Ried et al., "An Analysis of Anonymity in the Bitcoin System," http://arxiv.org/pdf/11 07.4524.pdf, May 2, 2012, 29 pages.
Second Office Action for Chinese Application No. 201480050033.5, dated May 8, 2019, 17 pages.
Office Action for European Application No. 14843697.5, dated Jul. 24, 2019, 6 pages.
Office Action for U.S. Appl. No. 14/484,047, dated Mar. 18, 2019, 11 pages.
Examination Report No. 1 for Australian Application No. 2014318712, dated Apr. 4, 2019, 3 pages.
Third Office Action for Chinese Application No. 201480050030.1, dated May 21, 2019, 18 pages.
Office Action for European Application No. 14843444.2, dated Jul. 24, 2019, 6 pages.
Examination Report No. 1 for Australian Application No. 2014318709, dated Mar. 30, 2019, 3 pages.
Office Action for European Application No. 14844749.3, dated Jul. 24, 2019, 5 pages.
Examination Report No. 1 for Australian Application No. 2014324843, dated May 14, 2019, 3 pages.
Examination Report No. 1 for Australian Application No. 2014324841, dated Apr. 11, 2019, 3 pages.
Second Office Action for Chinese Application No. 201480052901.3, dated Apr. 4, 2019, 14 pages.
Office Action for European Application No. 14849116.0, dated Jul. 30, 2019, 4 pages.

(56) References Cited

OTHER PUBLICATIONS

Second Office Action for Chinese Application No. 201480052902.8, dated Aug. 27, 2019, 32 pages.
Second Office Action for Chinese Application No. 201480050031.6, dated Sep. 24, 2019, 10 pages.
Office Action for U.S. Appl. No. 15/959,456, dated Sep. 20, 2019, 15 pages.

* cited by examiner

APPARATUS AND METHOD FOR SUPPORTING RELATIONSHIPS ASSOCIATED WITH CONTENT PROVISIONING

CROSS-REFERENCE TO RELATED APPLICATIONS AND PRIORITY CLAIM

This disclosure claims priority under 35 U.S.C. § 119(e) to the following patent applications:

U.S. Provisional Patent Application No. 61/883,949 filed on Sep. 27, 2013 and entitled "RELATIONSHIPS FOR CONTENT PROVISIONING;" and U.S. Provisional Patent Application No. 61/883,809 filed on Sep. 27, 2013 and entitled "AD-HOC DYNAMIC BINDING."

Both of these provisional patent applications are hereby incorporated by reference in their entirety.

TECHNICAL FIELD

This disclosure is directed in general to software and more specifically to an apparatus and method for supporting relationships associated with content provisioning.

BACKGROUND

It is well-known that videos may be broadcast or provided through a number of media, such as television, the Internet, DVDs, and the like. To finance such video broadcasts, commercial advertisements are often placed in the videos. Commercials, however, require that a video be momentarily interrupted while the commercials are displayed. Not only is this annoying to viewers, but digital video recorders (DVRs) allow video programs to be pre-recorded. When the video programs are viewed, DVRs allow the viewers to fast-forward through commercials, thereby defeating the effectiveness and value of the commercials. When commercials are de-valued, costs are not adequately covered, and broadcast service quality suffers as a result. In many cases, costs are made up by charging viewers for video services.

In many conventional systems, a variety of different content has little or no interactivity. This includes both videos and images. For example, when viewing video, different objects in the video are often merely part of a single video stream that is inseparable with respect to the different objects. Static advertisements near the video stream related to the video are not very compelling as they are separated from the video in such a way that a user is not encouraged to interact with the static advertisement.

SUMMARY

This disclosure provides an apparatus and method for supporting relationships associated with content provisioning.

In a first embodiment, a method includes receiving transaction information related to supplemental content that is presented in association with base content, where the transaction information includes an identification of a user. The method also includes identifying a relationship between the user and a content provider that provided the base content using the identification. The method further includes obtaining user transaction credentials from the content provider and completing a transaction for the user using the user transaction credentials.

In a second embodiment, an apparatus includes at least one memory configured to receive and store transaction information related to supplemental content that is presented in association with base content, where the transaction information includes an identification of a user. The apparatus also includes at least one processing device configured to identify a relationship between the user and a content provider that provided the base content using the identification, obtain user transaction credentials from the content provider, and complete a transaction for the user using the user transaction credentials.

In a third embodiment, a non-transitory computer-readable medium includes logic stored on the computer-readable medium. The logic is configured when executed to cause at least one processing device to receive transaction information related to supplemental content that is presented in association with base content, where the transaction information includes an identification of a user. The logic is also configured when executed to cause the at least one processing device to identify a relationship between the user and a content provider that provided the base content using the identification, obtain user transaction credentials from the content provider, and complete a transaction for the user using the user transaction credentials.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 5, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged system.

Figure 1:
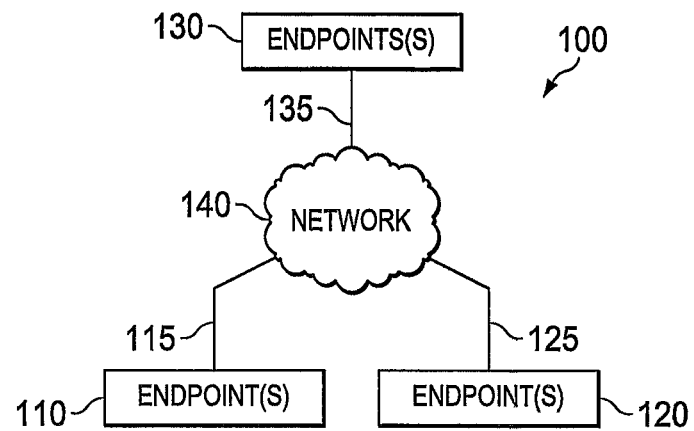
FIG. 1 illustrates an example communication system that can be utilized to facilitate communication between endpoints through a communication network according to this disclosure.

FIG. 1 illustrates an example communication system 100 that can be utilized to facilitate communication between endpoints through a communication network according to this disclosure. As shown in FIG. 1, the system 100 includes various endpoints 110, 120, and 130. In this document, the term "endpoint" generally refers to any device, system, or other structure that communicates with another endpoint.

Example endpoints 110, 120, and 130 include but are not limited to servers (such as application servers and enterprise servers), desktop computers, laptop computers, netbook computers, tablet computers (such as APPLE IPADs), switches, mobile phones (such as IPHONE and ANDROID-based phones), networked glasses (such as GOOGLE GLASS), networked televisions, networked disc players, components in a cloud-computing network, or any other device or component suitable for communicating information to and from a communication network. Endpoints 110, 120, and 130 may support Internet Protocol (IP) or any other suitable communication protocol(s). Endpoints 110, 120, and 130 may additionally include medium access control (MAC) and physical layer (PHY) interfaces, such as those that conform to the IEEE 701.11 standard. An endpoint 110, 120, and 130 can have a device identifier, such as a MAC address, and may have a device profile that describes the endpoint.

A communication network 140 facilitates communications between the endpoints 110, 120, and 130. Various links 115, 125, and 135 couple the endpoints 110, 120, and 130 to the communication network 140. The communication network 140 and associated links 115, 125, and 135 may include but are not limited to a public or private data network, a telephony network, a local area network (LAN), a metropolitan area network (MAN), a wide area network (WAN), a wireline or wireless network (such as GSM, CDMA, LTE, WIMAX, 5G, or the like), a local/regional/global communication network, portions of a cloud-computing network, a communication bus for components in a system, an optical network, a satellite network, an enterprise intranet, or any other communication links or combinations of the preceding. In particular embodiments, portions of the links 115, 125, 135 or the communication network 140 may be on or form a part of the Internet.

Although the endpoints 110, 120, and 130 generally appear as being in a single location in FIG. 1, various endpoints may be geographically dispersed, such as in cloud computing scenarios. Also, each endpoint could represent a fixed or mobile device. When the endpoints 110, 120, and 130 communicate with one another, any of a variety of security schemes may be utilized. As an example, in particular embodiments, the endpoints 110 and 120 may represent clients, and the endpoint(s) 130 may represent one or more servers in a client-server architecture. The server(s) may host a website, and the website may have a registration process whereby a user establishes a username and password to authenticate or log into the website. The website may additionally utilize a web application for any particular application or feature that may need to be served up to the website for use by the user. Additionally, in particular configurations, the communication between the endpoints 110 and 120 may be facilitated using a communication path through the endpoint 130.

Various embodiments described in this patent document may benefit from and/or utilize SMART CONTAINER technology from CINSAY, INC., which is briefly described below and is described more fully in U.S. Pat. No. 8,769,053 (which is hereby incorporated by reference in its entirety). This technology provides an innovative way for merchants to reach their customers online. In the traditional online sales model, merchants need to create search or display ads that show up when online consumers visit search engine sites or various web properties. If a consumer sees an interesting ad related to a product or service, the consumer needs to leave his or her current activity and visit some other web destination to discover more information or make an online purchase. Consumers have specific online behavior patterns. If consumers are actively shopping, the traditional multistep model is workable. The traditional advertising sales model requires that a consumer stop what he or she is doing and visit some other online destination. However, if consumers are on social sites interacting with friends, reading the news, playing games, or engaging in other online activities, they are much less likely to leave their current activities to visit some external Internet destinations.

The SMART CONTAINER model brings product information or a store to the consumer. The SMART CONTAINER code/technology virally syndicates across the web, for example, using components described with reference to FIGS. 1 and 5 or using other components. It is ideal for those types of destinations that online consumers tend to frequent, such as social networks and blogs. Regardless, if the SMART CONTAINER code is located on a web page, a blog article, a social network page or wall, or a mobile device, a consumer can complete a transaction right there with no need to be diverted to some external destination.

SMART CONTAINER objects are intelligent Internet objects that virally syndicate and propagate across the web and other connected networks and mobile devices. They can be configured in a variety of ways to address the entire value chain of online marketing and shopping. This includes impressions, clicks, lead generation, and performing e-commerce transactions. A modern shopping experience works best when interactive media is used. One of the most appealing forms of media for sales and shopping is video. It allows a much more lifelike representation than text or static pictures. It also creates a much richer product browsing or shopping experience.

SMART CONTAINER code is normally configured with a video player window, a selection of products or services being offered, and a variety of related video clips. This collection of video clips allows a consumer to learn more about the products or services being offered. The consumer can select any of these offered items to get more details, all enclosed within the SMART CONTAINER technology.

The offered items (products or services) may be items being advertised or sold. Depending on the type, the SMART CONTAINER code may allow a consumer to request to be contacted, or even purchase the object, right there. The consumer need not leave his or her current activity or web page. Offered items could also include or be associated with discounts or coupons. They may even be an opportunity to donate to a charity or political campaign. Of course, sometimes it does make sense to visit another Internet designation, and if appropriate the consumer can certainly be linked there as well.

Because the SMART CONTAINER code handles all the complexity, it can turn the simplest website into an instant e-commerce store. This enables anyone to transact online without having to deal with the complexity of setting up an e-commerce site. For merchants with an e-commerce site, it readily enables a much richer shopping experience. For the creative hobbyist or local band, it lets them readily sell directly to interested consumers. To support and promote them, supplemental items in the SMART CONTAINER code called ON-DEMAND merchandise can be offered. Merchants can custom design a selection of apparel with their art and graphics to be sold along with their own creations. ON-DEMAND fulfillment dynamically produces and ships their custom apparel for them, eliminating the need to manage inventory and providing their online customers with a richer line of products. Of course, because their instant e-commerce stores are based on SMART CON- TAINER objects, it can also propagate out onto all forms of viral syndication methods as well.

The SMART CONTAINER code is also auto-customizing according to particular configurations. If a device is a traditional personal computer (PC) or laptop, it will render using optimal technology, which for this purpose could represent FLASH. On mobile devices such as IPHONEs, IPADs, or ANDROID phones, this means HTML5 or a native interactive app will likely get used. The items in the SMART CONTAINER code also know about each other according to particular configurations. When a video is playing, a container can update product and service objects being shown that correspond with the particular sequence in a video segment. It allows a "mini QVC" shopping channel to be created and syndicated across the Internet. Beyond device type, there are other dimensions of customization. Smaller devices and some environments such as social sites restrict window sizes, so the SMART CONTAINER code adapts. In addition, it may be appropriate to provide different content based on geolocation, so the SMART CONTAINER code can customize for these, as well.

The SMART CONTAINER code virally syndicates across the Internet following the more popular network paths. SMART CONTAINER objects can be hosted on traditional web pages or blogs, contained in emails, operate on mobile devices, or propagate social networks. Because the SMART CONTAINER code is flexible, it can also be set up in the form factor of a display ad unit and distributed via ad servers on display advertising networks. When the code exists on social networks like FACEBOOK, it can ride the wave of user "likes." For example, if a woman shopper likes some great shoes shown in a SMART CONTAINER object interface, the SMART CONTAINER object can propagate directly to their "wall." Now all of her friends see the SMART CONTAINER object and can view or transact right there on their own walls. Of course, if any of her friends also "like" it, the SMART CONTAINER object propagates and rides the wave further out into that branch of the social network, yielding a potential exponential growth factor. The container does not necessarily involve products like shoes. As another example, a container can support a politician running for office. His or her supporters may be passionate about a message and "like" it, again making it available to their networks. Now, similarly-minded political supporters can view those messages and, if so moved, donate to the cause. Yet another example is sports. In this case, a sports fan may wish to watch content on his or her high-definition (HD) large screen television. More and more users have interconnected devices such as ROKU and CHROMECAST devices, and the SMART CONTAINER code may be sent to such IP television boxes, as well.

When merchants launch and syndicate their SMART CONTAINER objects onto the Internet, they want to know how their campaigns are performing. SMART CONTAINER objects report back status on events and transactions of interest such as impressions, video views, clicks, leads, and sales. All such events/transactions can be sent back as events occur, providing details on how they are doing. Because the containers are smart, they can be instructed to change behavior, offer different clips, update products, or to end when it is time to stop a marketing or sales campaign.

Another form of tracking relates to how the SMART CONTAINER code is propagated. A merchant may wish to use affiliates to help syndicate them and pay them a percentage based on the transactions resulting from their work. SMART CONTAINER objects can be tagged with affiliate tracking identifiers, allowing status reports and transactions from container instances or their descendants to be properly filtered. Another tracking usage may be for a politician to assign affiliate codes to his or her supporters and be able to measure whose efforts result in the most new supporters.

SMART CONTAINER objects are designed to be highly scalable according to particular configurations. Rather than burden a single website with massive traffic (which would result from a traditional model of bringing all consumers to a store), SMART CONTAINER code operates in a distributed manner. For example, the SMART CONTAINER code can execute where it is located, such as on a blog, a social network, or a mobile device. SMART CONTAINER objects fetch their instructions when started and then gather their product items and video streams from a worldwide distributed content delivery network. This results in a highly scalable architecture, allowing millions of concurrent consumers.

By bringing the store to the customer, the SMART CONTAINER code enables many new ways for merchants to connect with their consumers without disrupting the consumers' web activities. The end result is to connect the consumers directly with the merchants, eliminating the middleman and promoting a much more natural shopping experience.

The functionality of the above description may avail from any suitable components, such as those described in FIGS. 1 and 12 or other suitable components. The code itself may be written in any suitable format, including but not limited to Java, C++, C-sharp, HTML, HTML5, JAVA SCRIPT, PYTHON, RUBY, and the like.

There exists a variety of media content (video and audio) in the world that is independent, existing separate from any special containers such as the SMART CONTAINER code. Certain embodiments of this disclosure seek to harness the power of such content by dynamically binding supplemental content to the underlying base content. As a simple example, a video may be streamed from a content server, such as is provided by one of many video streaming services. According to certain embodiments of this disclosure, supplemental content is added dynamically to such content. In one or more embodiments, "dynamically" may also be referred to as "real-time." The disclosure below, among other things, describes the addition of such supplemental content and the determination of which supplemental content to provide. This can be done based on the base content, a user profile, a device profile, or other factors.

FIGS. 2A through 2E illustrate example dynamic bindings of supplemental content to base content according to this disclosure. As seen in FIGS. 2A through 2E, a base content 200 is generally shown. The base content 200 represents literally any type of visual or audio content—be it a picture, a streaming video, a live stream from a remote location, real-time content from the current location of a device, a web page, or other types of visual content. The supplemental content represents additional information related to the base content and/or a user accessing the base content. In one or more embodiments, the supplemental content can override the module playing the base content and expand the functionality of the module (such as with YOUTUBE).

In some embodiments, supplemental content may include additional information, configurable controls, selectable configurations, content transactional items such as products or services, and the like. Although the displayable area for the base content 200 is generally shown as having a rectangular boundary area, the displayable area for the base content 200 may take on other shapes. Additionally, the base content 200 may be shown in (or through) a virtually limitless number of devices, from mobile phones to computers to televisions.

As examples of the above, the base content 200 may be a video streamed through a video-based provider, such as YOUTUBE, VIMEO, NETFLIX, REDBOX INSTANT or others, being viewed on a computer, a mobile device, a television screen, or any other suitable device or devices. The base content 200 may also be a real-time view of content at a current location being viewed through an electronic device such as GOOGLE GLASS or a real-time view in a mobile computing device such as a tablet or phone. In yet other configurations, the base content 200 may be an image. In still other configurations, the base content 200 may be a web page.

Figure 2A:
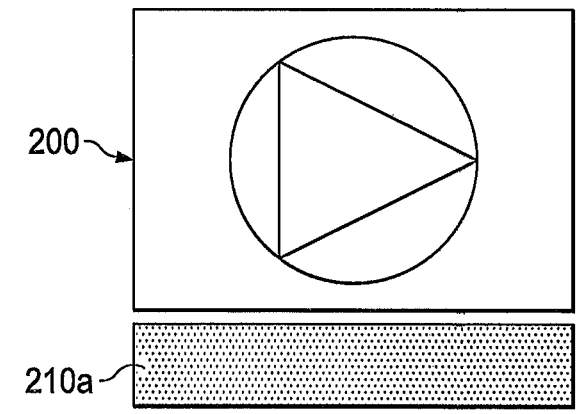
FIGS. 2A through 2E illustrate example dynamic bindings of supplemental content to base content according to this disclosure.
Figure 2B:
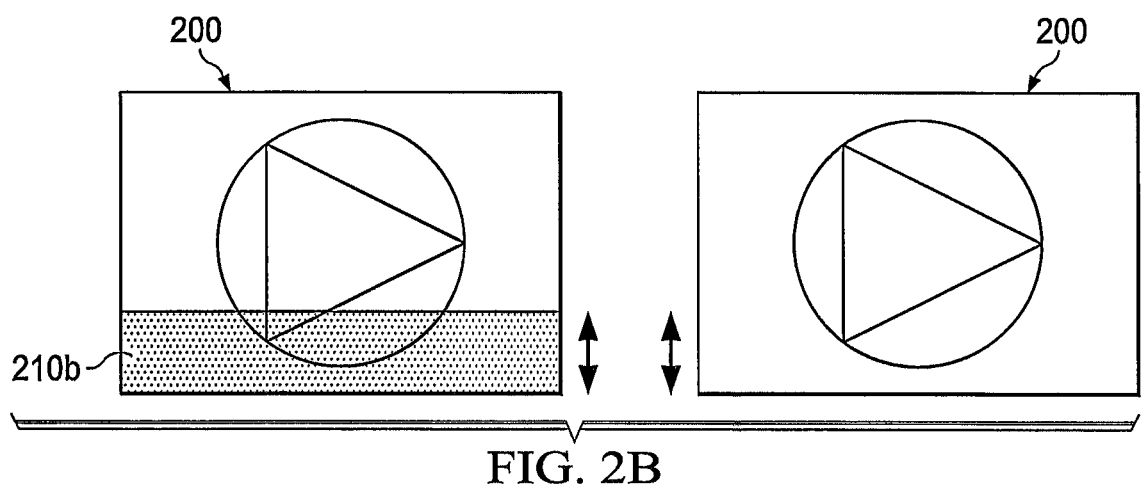
Figure 2C:
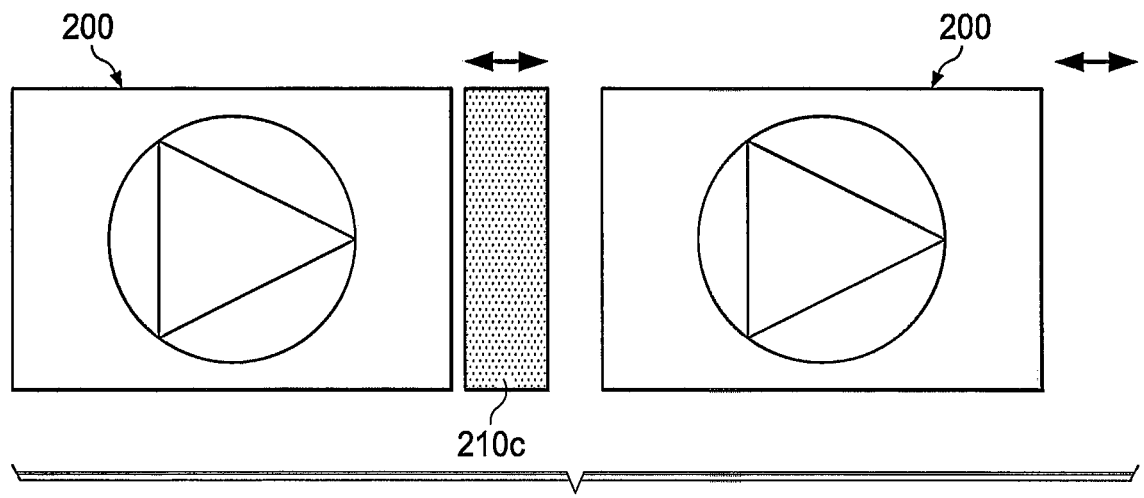

Also shown in FIGS. 2A through 2E are non-limiting examples of the supplemental content 210a-210e that are configured to dynamically bind to the base content 200. Although certain examples are provided, it should be understood that such examples are non-limiting and other configurations may be utilized as will become apparent to one of ordinary skill in the art having read this disclosure. In some configurations, the supplemental content may overlay the base content, whether partially transparent or not. Examples of supplemental content 210b and 210e overlaying the base content 200 are shown in FIG. 2B (left position) and FIG. 2E. In other configurations, the supplemental content may be positioned outside of the base content 200, such as to the left, right, top, bottom, or other positions. Examples of supplemental content 210a, 210c, and 210d outside of a boundary area of the base content 200 are shown in FIG. 2A, FIG. 2C (left position), and FIG. 2D.

In certain configurations, the supplemental content may be selectively displayable and/or selectively "hideable," such as due to user action or inaction. For example, in some configurations, a user interacting with a container for the base content may cause a menu with supplemental content to appear. Examples of these configurations are shown in FIGS. 2B and 2C with the double-edged arrows representing selective display-ability or selective hide-ability.

Figure 2D:
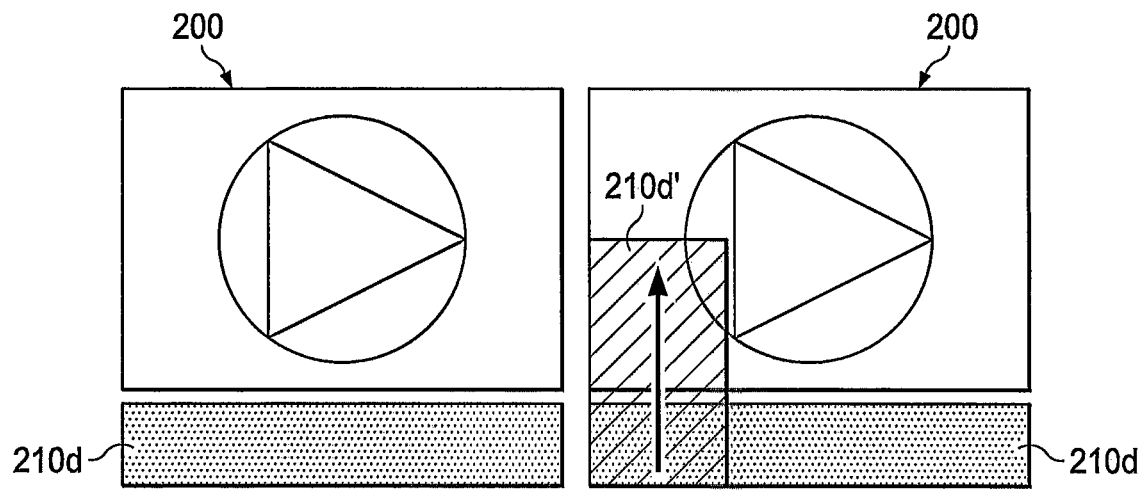
Figure 2E:
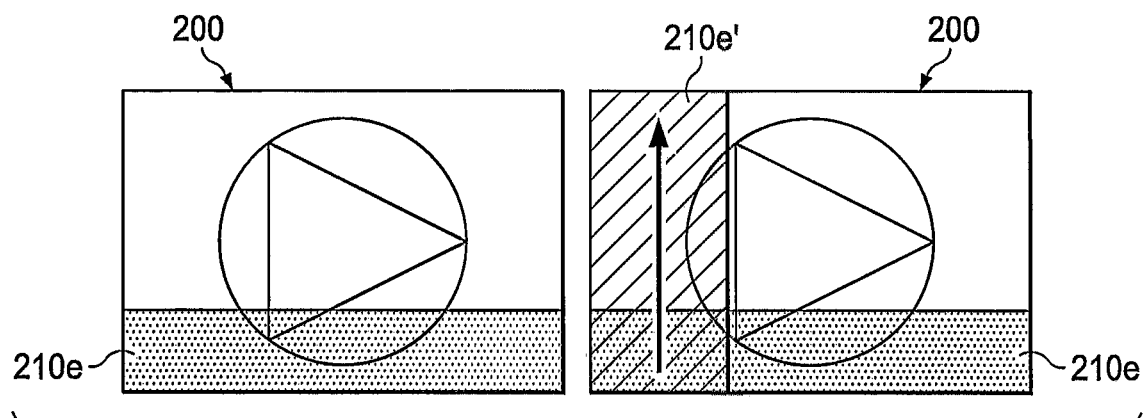

In still other configurations, the supplemental content may begin outside an area of the base content 200 and expand to cover, partially transparent or not, the base content 200. For example, as seen in FIG. 2D, the position of the supplemental content 210d on the left is just below a displayable area for the base content 200. However, in the position of the supplemental content 210d on the right (which may be the result of interactivity by a user), the supplemental content 210d expands to at least partially overlay the base content 200 (as shown by an area 210d'). A similar configuration is also shown in FIG. 2E except that the supplemental content 210e began as an overlay of the screen and an area 210e' covers an entire edge of the displayable area for the base content 200.

In particular configurations, the supplemental content is independent of the base content and is bound dynamically as the base content is displayed. For example, in particular settings, a web page may have a container (such as an embed code) that instantiates (loads or invokes) (i) the base content and (ii) the supplemental content. According to certain configurations, a call for supplemental content can be based on what is being shown in the base content, with the supplemental content specifically relating to the base content. Additionally, the supplemental content may be based on other parameters, such as a user profile or a geolocation of the user viewing the base content. As another example, in other configurations, a page analyzer can review a web page to determine locations where base content is contained and overlay or adjust such base content.

According to this specification, the concept of "binding" refers to associating supplemental content with base content, whereas "dynamic binding" refers to associating content in real time, such as upon detection of the base content. In particular configurations, the initial association may allow the subsequent sharing of both the supplemental content and the base content together, as will be described with reference to figures below. More particularly, in certain configurations, an initial dynamic binding yields a shareable container (which may or may not be instantiated by an embed code) that, upon being shared to a new device, instantiates the underlying base content and the supplemental content. In other configurations, no such container is created, and a dynamic binding or dynamic association of the supplemental content is done for every playing of the video. In yet other configurations, supplemental content may be bound to a video, and the particular content is dynamically determined when the video is requested for playback.

A variety of technologies may be used for the above-described dynamic binding. As an example non-limiting configuration, the supplemental content may be configured as one layer in a display, where the base content is another layer. In such configurations, the layer for the supplemental content may be forward in the layers to allow an overlay as might be appropriate. In other configurations, the supplemental content may simply be provided a positioning with respect to the base content.

In particular configurations, the supplemental content can be dynamically sized based on a determined size of the base content and/or the spacing configurations for the device on which the base content and the supplemental content will be displayed. In other configurations, given a particular size for the base content, the supplemental content may use the same size for a container that requests a slightly reduced-size base content with extra room for the supplemental content. In implementing such a configuration, the technology can intercept a request for the base content and redirect such a request in order to request a container that, in turn, requests the base content and then the supplemental content. This latter configuration may be beneficial for scenarios where the supplemental content does not overlay the base content.

As referenced above, a variety of technologies may be utilized to recognize the content. In some configurations, content fingerprinting is utilized. For example, almost every piece of content has certain identifying characteristics that can be used to uniquely identify the content. As a non-limiting example, audio has unique sound wave characteristics when the audio is played. This remains true even with varying qualities of content. Examples of content fingerprinting are used by GOOGLE in their GOOGLE GOGGLES product for images, SHAZAM's audio fingerprinting, and GRACENGIES audio fingerprinting. For video fingerprinting, the fingerprint of the video may be based on just the audio feed, just the video feed, or both. Additionally, for the video fingerprinting, frames can be extracted and analyzed, where a confidence raises based on matches for multiple frames of content. Upon recognition of the fingerprint for the content, the content is identified, and appropriate supplemental information can be obtained. Yet other details surrounding content fingerprinting will become apparent to one of ordinary skill in the art after reviewing this specification.

In addition to the above content fingerprinting, other types of fingerprinting-type analysis can be done to either identify the content or enhance a confidence that the content is actually the content it is believed to be. Parameters that can be evaluated include the IP address or domain name from which the content is obtained, the encoding parameters (such as the codec and data transmission rate per second of video), the size of the content (such as if it is an image, pixel size, and image size), and specific metadata tags associated with the content. A variety of other content characteristics will become apparent to one of ordinary skill in the art after review of this disclosure.

A variety of other types of content recognition technologies may also be utilized according to this disclosure to recognize, among other things, audio, pictures, and video. This disclosure is not limited to any particular technology. For example, in addition to the above recognition techniques, other techniques may involve an actual electronic reading of a tag that is placed on an object in the real world.

In addition to recognizing the content itself, supplemental content can also be customized based on characteristics of a user, a device, and/or other statistical information. Non-limiting examples include a profile that has been developed corresponding to a user (including but not limited to FACE-BOOK SHADOW profiles), geographical location, IP address, any suitable device identifier (such as MAC address), items posted in a header that identify a client (such as GOOGLE CHROME browser), and time of the day. Based on such information, the supplemental content can be customized to correspond to a particular user.

Figure 3A:
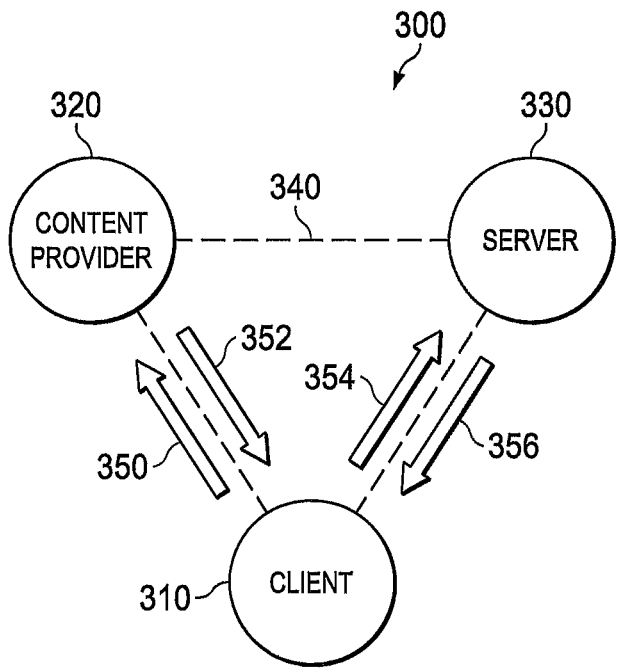
FIGS. 3A through 3C illustrate example content provisioning arrangements with varying relationships according to this disclosure.
Figure 3B:
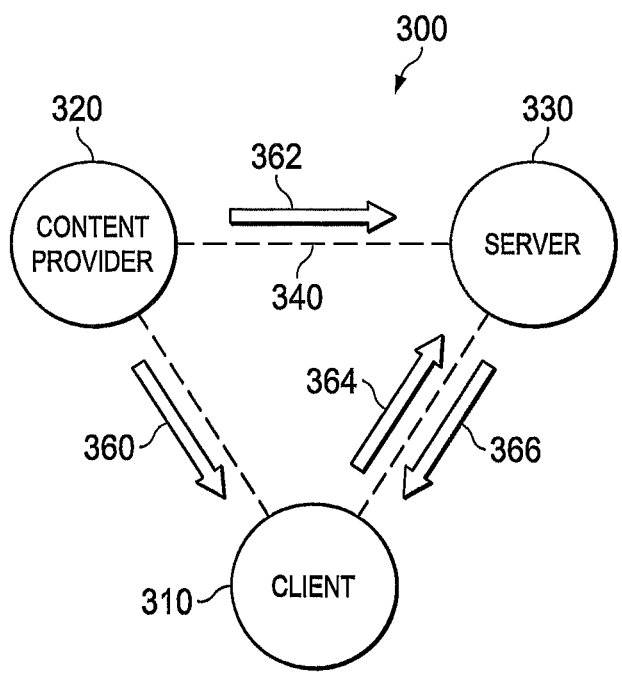
Figure 3C:
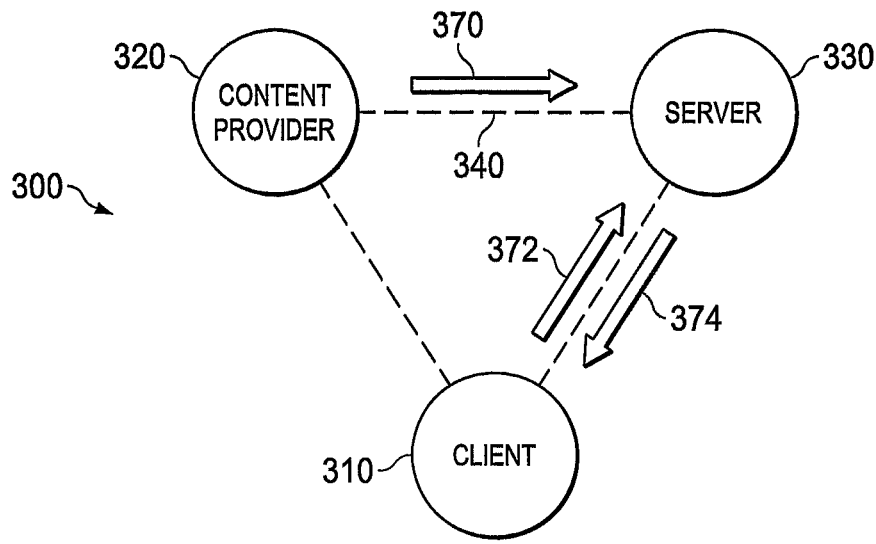

FIGS. 3A through 3C illustrate example content provisioning arrangements with varying relationships according to this disclosure. In these figures, a communication system can be utilized to facilitate communications between a client 310, a content provider 320, and a server 330 through a communication network. In particular embodiments, the content provisioning arrangements shown in FIGS. 3A through 3C represent different examples of the communication system 100, where the client 310, content provider 320, and server 330 denote different endpoints 110, 120, and 130.

In some embodiments, the content provider 320 may have a pre-existing relationship with the client 310. The pre-existing relationship between the content provider 320 and the client 310 could include an agreement to provide base content in some manner. As noted above, the base content can represent any type(s) of audio and/or visual content. In some embodiments, the base content may be provided to the client 310 through an authorized relationship 340 between the content provider 320 and a user of the client 310. However, in other examples, there is not an authorized relationship 340. Generally, the user may access the base content through the Internet, an over-the-air connection, a satellite connection, visually, audibly, or the like. In some examples, the user pays a subscription fee for the authorized relationship 340. In other examples, the user simply registers with the content provider 320. For example, in NETFLIX, a user may pay a monthly subscription fee for access to base content (such as movies and TV shows). In YOUTUBE, a user may register with a unique identifier, such as an email address. In some examples, the content provider 320 may have payment information for the user retained with a system of the content provider 320.

Note that while a single client 310 is shown here, a user could be associated with multiple clients 310. For example, the user may view and/or listen to base content using one client device while viewing supplemental content at another client device. As a particular example, the user may be watching a movie or TV show on a television while viewing supplemental content on a GOOGLE GLASS device. Also, supplemental content may be positioned in a number of ways including, but not limited to, above the base content, below the base content, to the side of the base content, overlaid on top of the base content, or the like.

In one or more embodiments the server 330 uses context to be able to associate appropriate products and services to display with base content. These content/supplemental associations could be sourced into a supplemental content repository. Server 330 maps and identifies objects in those videos such as people, products, services, and the like. Server 330 may also be referred to as the supplemental content server.

In an example embodiment, when base content, such as, for example, video is presented, server 330 uses data in the repository to find these associations. These are constructed by earlier data mining for keywords and narrative text descriptions regarding that video. Sources of data mining may be, for example, but not limited to, title of video file, narrative text on web page containing that video file, e-commerce web sites narrative product descriptions of their products described in associated video, business web sites narrative descriptions of services described in associated videos, broadcast listings (such as TV guide, CATV broadcast descriptions, and the like), movie review site descriptions, sports video reviews, YOUTUBE/VIMEO associated keywords and narrative descriptions, news web sites narrative descriptions of related video clips, video site maps, methods for web sites identifying keywords related to video content, narrative text on web pages linked by video site maps, image recognition of pre-processed stored video such as recognizing people (celebrities, sports figures, politicians), products (cars, clothes, shoes, and the like), an image template of target images to scan within video frames, and the like.

In an example embodiment, when scanning is done, specific sub-sections of the video can be associated with que-points to show appropriate supplemental content during period in video that the related objects are displayed.

In an example embodiment, once base objects are known to be contained in the base content are identified, the base objects can use these to seek appropriate available products and services supplemental content which can be used with that base content. Say the base content shows a sports celebrity based on info in the repository, then server 330 may find supplemental content related to t-shirts, books, endorsed products by that sports celebrity which can be served as supplemental content with that base content. If server 330 sees a particular car it may provide a lead generation supplemental content item to a local auto dealer.

In an example, server 330 can both identify objects, and from the objects, appropriate products and services available to link to the supplemental content.

In FIG. 3A, the content provider 320 may provide base content directly to a user's client 310. The base content may be provided through a number of different mediums. Examples include, but are not limited to, a television, an application on the television, satellite, the Internet, and other forms of communication. In this relationship, the user may receive supplemental content separately from the server 330.

In some embodiments, there are a number of different communications 350-356 between the client 310, the content provider 320, and the server 330. In this example, communications 350 may include a purchase order for an item associated with supplemental content, and communications 352 may include the base content. Also, communications 354 may include a purchase order for an item associated with the supplemental content, and communications 356 may include the supplemental content. Any purchase order received by the content provider 320 could be forwarded to the server 330.

In this relationship, the user may purchase at least one product or service through the content provider 320 and/or the server 330. The client 310, the content provider 320, and the server 330 may utilize some type of authentication and authorization scheme to provide purchasing authority for items (such as one or more products or services) associated with supplemental content. In an example configuration, the content provider 320 may already have payment information for the user if the user subscribes to a service of the content provider 320. The authorization scheme may allow the server 330 to retrieve payment information from the content provider 320 for the purposes of executing a purchase on behalf of the user. In other embodiments, the server 330 could include the user's payment information.

As a specific example of this functionality, the user may purchase one or more items associated with supplemental content by using his or her payment information already on file with the content provider 320. If the user purchases an item through the server 330, the owner of the server 330 (such as CINSAY or others) may have a fee sharing arrangement with the content provider 320 for the purchase. Such a fee sharing arrangement may otherwise incentivize the content provider 320 to allow supplemental content to be displayed with the base content provided by the content provider 320.

In FIG. 3B, the content provider 320 may provide base content directly to a user's client 310 and to the server 330. The base content may be provided through a number of different mediums including, but not limited to, a television, an application on the television, satellite, the Internet, and other forms of communication. In this relationship, the user's client 310 may receive supplemental content and base content separately from the server 330. Also, in this relationship, the user may purchase one or more products or services through the server 330.

In some embodiments, there are a number of different communications 360-366 between the client 310, the content provider 320, and the server 330. In this example, communications 360 may include the base content, and communications 362 may include the base content. Also, communications 364 may include a purchase order for an item associated with the supplemental content, and communications 366 may include the supplemental content.

Once again, the user may be associated with a single client 310 or multiple clients 310. For example, the user may view and/or listen to the base content using one client device while viewing supplemental content at another client device. As a particular example, the user may be watching a movie, TV show, or other base content on a television while viewing the supplemental content and the base content on another client device like a tablet computer. The supplemental content may be positioned in a number of ways including, but not limited to, above the base content, below the base content, to the side of the base content, overlaid on top of the base content, or the like.

In these embodiments, the user may receive additional benefits by receiving the base content through a container provided by the server 330. For example, the user may be able to rewind the base content to a point in time that displays desired supplemental content. As another example, the user may be able to watch base content without commercial interruption. As yet another example, the user may be able to receive a discount on one or more purchased items associated with the supplemental content.

As noted above, the client 310, the content provider 320, and the server 330 may utilize some type of authentication and authorization scheme to provide purchasing authority for items (such as one or more products or services) associated with the supplemental content. The authorization scheme may allow the server 330 to retrieve the payment information for the purposes of executing a purchase on behalf of the user, although the server 330 could also have the payment information already on file. If the user purchases an item through the server 330, the owner of the server 330 (such as CINSAY) may provide compensation to the content provider 320 for the purchase.

In FIG. 3C, the content provider 320 may again provide base content to the server 330. In this relationship, the user's client may receive supplemental content and the base content both from the server 330 without receiving the base content directly from the content provider 320. The base content may be provided through a number of different mediums including, but not limited to, a television, an application on the television, satellite, the Internet, and other forms of communication.

In some embodiments, there are a number of different communications 370-374 between the client 310, the content provider 320, and the server 330. In this example, communications 370 may include the base content, communications 372 may include a purchase order for an item associated with the supplemental content, and communications 374 may include the base content and the supplemental content.

In this relationship, the user receives all content from the server 330. For example, the user may log into a network provided by the content provider 320 through a container provided by the server 330. As a particular example, a user may log in, select, and watch a movie from NETFLIX through a container provided by the server 330. Supplemental content is then provided by the server 330 along with the requested base content. The supplemental content may be positioned in a number of ways including, but not limited to, above the base content, below the base content, to the side of the base content, overlaid on top of the base content, or the like. In this relationship, the user may once again purchase one or more items associated with the supplemental content through the server 330.

In these embodiments, the user may receive additional benefits by receiving the base content through a container provided by the server 330. For example, the user may be able to rewind the base content to a point in time that displays desired supplemental content. As another example, the user may be able to watch base content without commercial interruption. As yet another example, the user may be able to receive a discount on one or more purchased items associated with the supplemental content.

Once again, the client 310, the content provider 320, and the server 330 may utilize some type of authentication and authorization scheme to provide purchasing authority for items (such as one or more products or services) associated with the supplemental content. The authorization scheme may allow the server 330 to retrieve the payment information for the purposes of executing a purchase on behalf of the user, although the server 330 could also have the payment information already on file. If the user purchases an item through the server 330, the owner of the server 330 (such as CINSAY) may provide compensation to the content provider 320 for the purchase.

In some embodiments, the user may have a subscription with the content provider 320 and/or with the owner of the server 330. For example, the owner of the server 330 and the content provider 320 may have an arrangement where the server 330 is able to provide the base content without commercial interruption. The owner of the server 330 may then form a subscription with the user for this benefit.

The following provides some non-limiting examples of scenarios that may occur with any of the embodiments of FIGS. 3A through 3C. Assume a user is watching a show on a television, but the show is currently being broadcast and is interrupted by commercials. The user's client 310 may utilize any suitable technology to recognize the show being broadcast, such as the fingerprinting techniques described above. Upon appropriate authorization, the same content can be shown on the same or different device (such as CHROMECAST connected to a TV or IPAD) without commercial interruption. In other words, the content provider may provide a non-commercial interrupted version of the content, provided the content provider receives compensation in some other form (such as a portion of a sale associated with the supplemental content displayed during the non-commercial interrupted version of the content).

Scenarios such as the preceding may also be used with live broadcasts, where a user is allowed to effectively rewind the broadcasted show back to the beginning for play without commercial interruption. Upon playback, supplemental content is displayed in lieu of traditional commercials. The supplemental content may or may not be related to the content being played.

In certain scenarios, a user is provided an enhanced experience as information about items may be displayed. Further, a user may be allowed to rewind a show to the beginning or other point (and playback without commercials) in scenarios where they started watching a show after it started. Additionally, in scenarios where payment credentials are stored (such as subscription credentials), a user may purchase items without entering any credentials. In this way, content providers are incentivized to allow base content to be displayed in conjunction with supplemental content since the content providers may share in any revenue generated from the display of the supplemental content with the base content.

Figure 4:
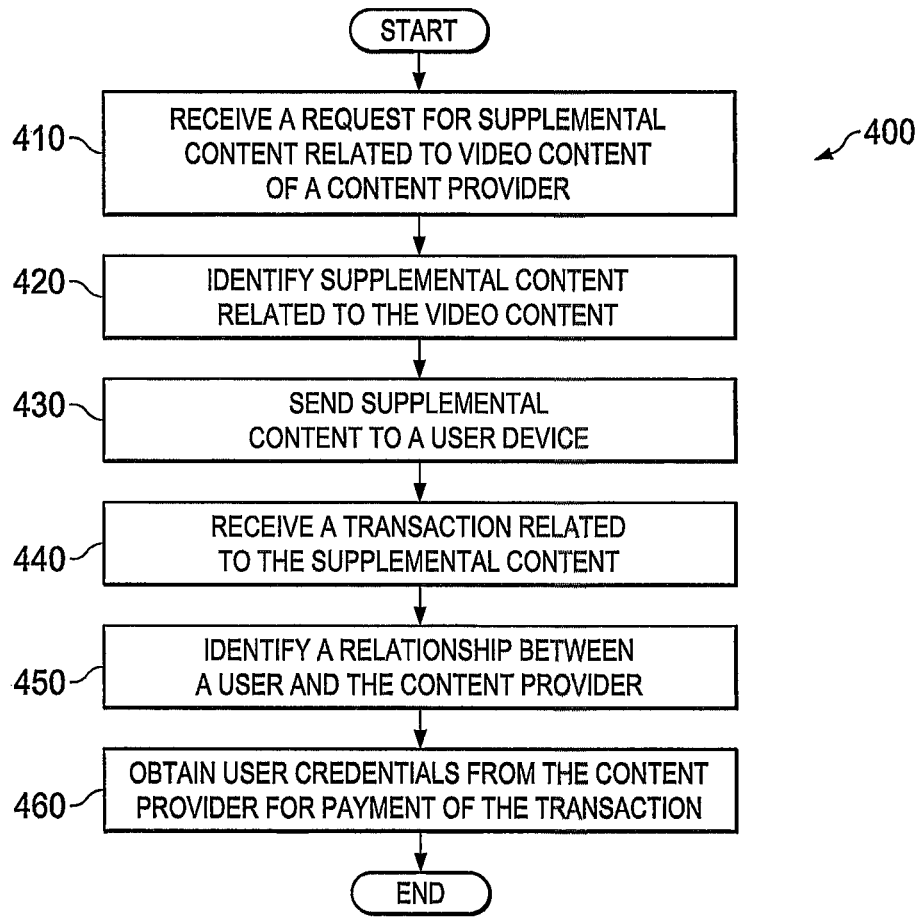
FIG. 4 illustrates an example process for managing a relationship between a user and a content provider according to this disclosure.
Figure 5:
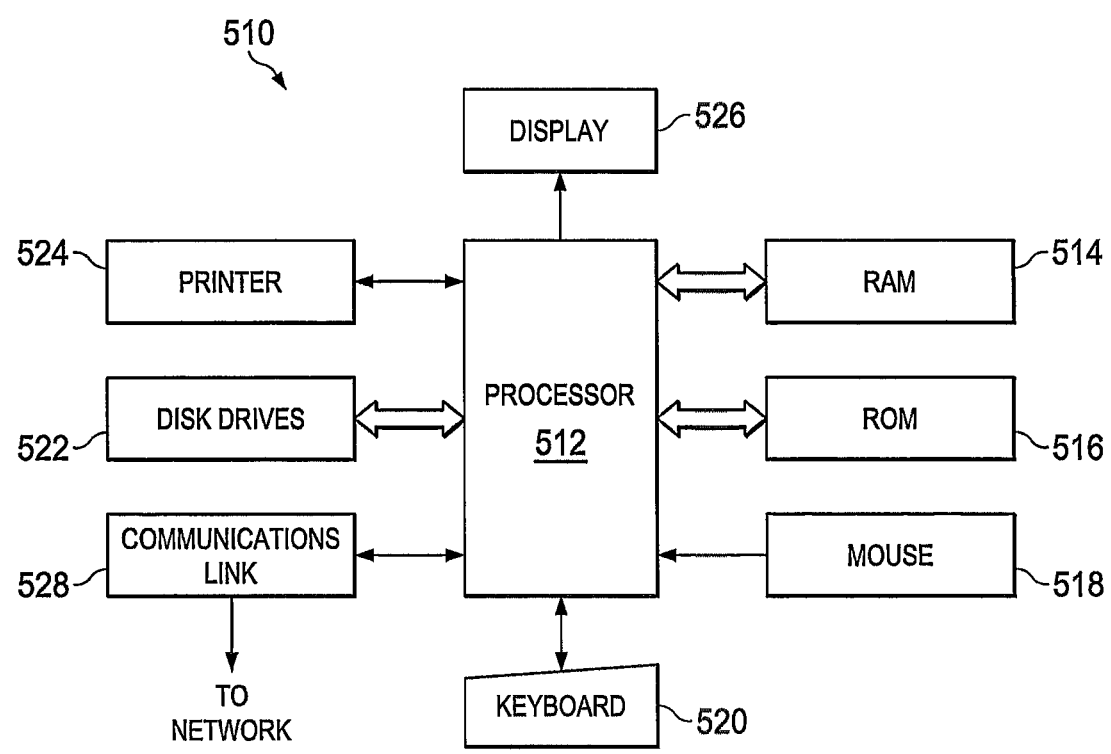
FIG. 5 illustrates an example computing device for n-level replication of supplemental content according to this disclosure.

FIG. 4 illustrates an example process 400 for managing a relationship between a user and a content provider according to this disclosure. The process 400 may, for example, be performed by at least one processing device 512 as shown in FIG. 5 and described below. In the following description, the at least one processing device 512 is referred to as a controller, although the process 400 could be performed by any other suitable device.

At step 410, a controller receives a request from a user device for supplemental content related to video content of a content provider. The user device may represent any suitable endpoint, including but not limited to a laptop, tablet, GOOGLE GLASS, mobile device, and the like.

At step 420, the controller identifies the supplemental content related to the video content. In some embodiments, the controller identifies at least one value related to one or more products or services, where the at least one value is associated with the video content. This could be done in any suitable manner, such as by locally or remotely identifying characteristics of the media, such as its fingerprint, title, size, and the like. The value can also be provided through a data file, such as but not limited to an XML file. The value can also be retrieved by data mining Internet information associated with the video content. For instance, the value could be found by identifying a website providing values for the video content.

The identified supplemental content can provide additional information about one or more products or services. For example, the additional information could include pricing, descriptions, reviews, or the like about the one or more products or services. The supplemental information can also include controls related to the one or more products or services, the additional information, and configurations related to the one or more products or services. In some embodiments, controls could support interactions available with the one or more products or services. Additionally, user parameters may be sent with the values discussed above to help identify supplemental content to send to the user.

In some embodiments, supplemental content is added dynamically to base content. The term "dynamically" may also be referred to as "real-time." The addition of supplemental content to base content and the determination of which supplemental content to provide can be done based on the base content, a user profile, a device profile, or other factors. Also, in some embodiments, the controller can dynamically bind the supplemental content to the base video content through a supplemental interactive display. The supplemental interactive display can override the controls of a display previously displaying the video. For example, the user's client 310 could normally display the base content within a viewer, and the supplemental interactive display could override or overlay the viewer.

At step 430, the controller sends the supplemental content to the user device. As described above, this step may or may not include sending the base content to the user device.

At step 440, the controller receives a transaction related to the supplemental content, where the transaction includes an identification of the user. In some embodiments, a "transaction" may represent a purchase of one or more products or services shown, described in, or otherwise associated with the supplemental content. The identification can represent identifying information about the user. The identification allows a content provider 320 or a server 330 to access an account of the user to access payment information and/or subscription information.

At step 450, the controller identifies the relationship between the user and the content provider using the identification. This could include, for example, the controller determining whether the user is a subscriber of the content provider. At step 460, the controller obtains user transaction credentials from the content provider or server for payment of the transaction. The phrase "user transaction credentials" represents payment information, such as, but not limited to, bank account information, subscription information, credit card information, PAYPAL information, GOOGLE WALLET information, and the like. At this point, the transaction can be finalized, such as when an order for one or more products or services is initiated. Also, revenue associated with the order can be divided between the entity operating the server 330 and the entity operating the content provider 320. Additionally, a request for base content may include user login credentials. The phrase "user login credentials" represents login information with a content provider to access base content of that content provider. For example, a user may have user login credentials for access to HULU, NETFLIX, HBOGO, and the like.

FIG. 5 illustrates an example computing device 500 for dynamically binding supplemental content according to this disclosure. The computing device 500 here could be used to implement any of the techniques or functions described above, including any combination of the techniques or functions described above. The computing device 500 may generally be adapted to execute any of suitable operating system, including WINDOWS, MAC OS, UNIX, LINUX, OS2, IOS, ANDROID, or other operating systems.

As shown in FIG. 5, the computing device 500 includes at least one processing device 512, a random access memory (RAM) 514, a read only memory (ROM) 516, a mouse 518, a keyboard 520, and input/output devices such as a disc drive 522, a printer 524, a display 526, and a communication link 528. In other embodiments, the computing device 500 may include more, less, or other components. Computing devices come in a wide variety of configurations, and FIG. 5 does not limit the scope of this disclosure to any particular computing device or type of computing device.

Program code may be stored in the RAM 514, the ROM 516 or the disc drive 522 and may be executed by the at least one processing device 512 in order to carry out the functions described above. The at least one processing device 512 can be any type(s) of processing device(s), such as one or more processors, microprocessors, controllers, microcontrollers, multi-core processors, and the like. The communication link 528 may be connected to a computer network or a variety of other communicative platforms, including any of the various types of communication networks 140 described above. The disc drive 522 may include a variety of types of storage media such as, for example, floppy drives, hard drives, CD drives, DVD drives, magnetic tape drives, or other suitable storage media. One or multiple disc drive 522 may be used in the computing device 500.

Note that while FIG. 5 provides one example embodiment of a computer that may be utilized with other embodiments of this disclosure, such other embodiments may utilize any suitable general-purpose or specific-purpose computing devices. Multiple computing devices having any suitable arrangement could also be used. Commonly, multiple computing devices are networked through the Internet and/or in a client-server network. However, this disclosure may use any suitable combination and arrangement of computing devices, including those in separate computer networks linked together by a private or public network.

The computing devices 500 could represent fixed or mobile devices, and various components can be added or omitted based on the particular implementation of a computing device. For example, mobile devices could include features such as cameras, camcorders, GPS features, and antennas for wireless communications. Particular examples of such mobile devices include IPHONE, IPAD, and ANDROID-based devices.

Although the figures above have described various systems, devices, and methods related to supporting relationships associated with content provisioning, various changes may be made to the figures. For example, the designs of various devices and systems could vary as needed or desired, such as when components of a device or system are combined, further subdivided, rearranged, or omitted and additional components are added. As another example, while the process 400 is shown as a series of steps, various steps in the process could overlap, occur in parallel, occur in a different order, or occur any number of times. In addition, examples of graphical presentations are for illustration only, and content can be presented in any other suitable manner. It will be understood that well-known processes have not been described in detail and have been omitted for brevity. Although specific steps, structures, and materials may have been described, this disclosure may not be limited to these specifics, and others may be substituted as it is well understood by those skilled in the art, and various steps may not necessarily be performed in the sequences shown.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Other changes, substitutions, and alterations are also possible without departing from the invention as defined by the following claims.

What is claimed is:

1. A processor-implemented method comprising:
receiving information from a user compute device, the user compute device implementing a shareable media container and also presenting a base content via the shareable media container, the information from the user compute device including transaction information related to supplemental content that is presented in association with the base content in the shareable media container, the transaction information including an identification of a user associated with the user compute device;
identifying a relationship between the user and a content provider that provided the base content in the shareable media container using the identification of the user;
obtaining payment information from the content provider based on the identified relationship; and
completing a transaction for the user in the shareable media container using the obtained payment information without interrupting the presenting at the user compute device of the base content via the shareable media container and without requiring the user to enter payment credentials for the transaction.

2. The processor-implemented method of claim 1, further comprising:
receiving a request for supplemental content from the user compute device implementing the shareable media container;
identifying the appropriate supplemental content related to the base content in response to the request; and
sending the supplemental content to the user compute device implementing the shareable media container.

3. The processor-implemented method of claim 2, wherein identifying the supplemental content related to the base content comprises:
identifying at least one value related to one or more products or services, the at least one value associated with the base content;
obtaining the supplemental content based on the at least one value, the supplemental content providing additional information about the one or more products or services; and
dynamically binding the supplemental content to the base content in the shareable media container.

4. The processor-implemented method of claim 1, further comprising:
receiving a request for base content from the user compute device implementing the shareable media container;
retrieving the base content from the content provider; and
sending the base content to the user compute device implementing the shareable media container.

5. The processor-implemented method of claim 4, wherein the request comprises user login credentials.

6. The processor-implemented method of claim 1, wherein receiving the transaction information comprises receiving the transaction information from the content provider.

7. The processor-implemented method of claim 1, wherein receiving the transaction information comprises receiving the transaction information from the user compute device implementing the shareable media container that presents at least one of the base content and the supplemental content to the user.

8. An apparatus comprising:
at least one memory configured to receive and store information from a user compute device, the user device implementing a shareable media container and also presenting a base content via the shareable media container, the information from the user device including transaction information related to supplemental content that is presented in association with the base content in the shareable media container, the transaction information including an identification of a user associated with the user device; and
at least one processing device configured to:
identify a relationship between the user and a content provider that provided the base content in the shareable media container using the identification of the user;
obtain payment information from the content provider based on the relationship; and
complete a transaction for the user in the shareable media container using the payment information without interrupting the presenting at the user device of the base content via the shareable media container and without requiring the user to enter payment credentials for the transaction.

9. The apparatus of claim 8, wherein the at least one processing device is further configured to:
receive a request from the user device for the supplemental content;
identify the appropriate supplemental content related to the base content in response to the request; and
initiate transmission of the supplemental content to the user device.

10. The apparatus of claim 9, wherein the at least one processing device is configured to:
identify at least one value related to one or more products or services, the at least one value associated with the base content;
obtain the supplemental content based on the at least one value, the supplemental content providing additional information about the one or more products or services; and
dynamically bind the supplemental content to the base content.

11. The apparatus of claim 8, wherein the at least one processing device is further configured to:
receive a request from the user device for the base content;
retrieve the base content from the content provider; and
initiate transmission of the base content to the user device.

12. The apparatus of claim 11, wherein the request comprises user login credentials.

13. The apparatus of claim 8, wherein the at least one processing device is configured to receive the transaction information from the content provider.

14. The apparatus of claim 8, wherein the at least one processing device configured to receive the transaction information from the user device that presents at least one of the base content and the supplemental content to the user.

15. A non-transitory computer-readable medium comprising logic stored on the computer-readable medium, the logic configured when executed to cause at least one processing device to:
receive information from a user device, the user device implementing a shareable media container and also presenting a base content via the shareable media container, the information from the user device including transaction information related to supplemental content that is presented in association with the base content in the shareable media container, the transaction information comprising an identification of a user of the shareable media container;
identify a relationship between the user of the shareable media container and a content provider that provided the base content in the shareable media container using the identification of the user;
obtain payment information from the content provider based on the relationship; and
complete a transaction for the user of the shareable media container using the payment information without interrupting the presenting at the user device of the base content via the shareable media container and without requiring the user to enter payment credentials for the transaction.

16. The non-transitory computer-readable medium of claim 15, wherein the logic is further configured when executed to cause the at least one processing device to:
receive a request from the user device for the supplemental content;

identify the appropriate supplemental content related to the base content in response to the request; and initiate transmission of the supplemental content to the user device.

17. The non-transitory computer-readable medium of claim 15, wherein the logic is configured when executed to cause the at least one processing device to:

identify at least one value related to one or more products or services, the at least one value associated with the base content;

obtain the supplemental content based on the at least one value, the supplemental content providing additional information about the one or more products or services; and dynamically bind the supplemental content to the base content.

18. The non-transitory computer-readable medium of claim 15, wherein the logic is further configured when executed to cause the at least one processing device to:

receive a request from the user device for the base content;

retrieve the base content from the content provider; and initiate transmission of the base content to the user device.

19. The non-transitory computer-readable medium of claim 15, wherein the logic is configured when executed to receive the transaction information from the content provider.

20. The non-transitory computer-readable medium of claim 15, wherein the logic is configured when executed to receive the transaction information from the user device that presents at least one of the base content and the supplemental content to the user.

* * * * *